US012770387B2

(12) United States Patent
Li et al.

(10) Patent No.: US 12,770,387 B2
(45) Date of Patent: Oct. 20, 2026

(54) IMAGE PROCESSING METHOD, NEURAL NETWORK TRAINING METHOD, AND RELATED DEVICE

(71) Applicant: HUAWEI TECHNOLOGIES CO., LTD., Shenzhen (CN)

(72) Inventors: Wenshuo Li, Beijing (CN); Hanting Chen, Beijing (CN); Jianyuan Guo, Beijing (CN); Ziyang Zhang, Beijing (CN); Yunhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 18/894,274

(22) Filed: Sep. 24, 2024

(65) Prior Publication Data

US 2025/0014324 A1 Jan. 9, 2025

Related U.S. Application Data

(63) Continuation of application No. PCT/CN2023/082159, filed on Mar. 17, 2023.

(30) Foreign Application Priority Data

Mar. 25, 2022 (CN) ......................... 202210302717.6

(51) Int. Cl.
*G06V 10/82* (2022.01)
*G06V 10/776* (2022.01)

(52) U.S. Cl.
CPC ............ *G06V 10/82* (2022.01); *G06V 10/776* (2022.01)

(58) Field of Classification Search
None
See application file for complete search history.

(56) References Cited

U.S. PATENT DOCUMENTS 12,347,159 B2 * 7/2025 Dey ...................... G01S 13/505
2016/0358075 A1 * 12/2016 Zhang .................... G06N 3/049
(Continued)

FOREIGN PATENT DOCUMENTS

CN 114091663 A 2/2022
CN 114821096 A 7/2022

OTHER PUBLICATIONS

W. Li, H. Chen, J. Guo, Z. Zhang and Y. Wang, "Brain-Inspired Multilayer Perceptron With Spiking Neurons", Proceedings of the IEEE/CVF Conference on Computer Vision and Pattern Recognition (CVPR), 2022, pp. 783-793. (Year: 2022).*
(Continued)

*Primary Examiner* — Sath V Perungavoor
(74) *Attorney, Agent, or Firm* — WOMBLE BOND DICKINSON (US) LLP

(57) ABSTRACT

An image processing method, a neural network training method, and a related device are provided. The method may apply an artificial intelligence technology to the image processing field. The method includes: performing feature extraction on a to-be-processed image by using a first neural network, to obtain feature information of the to-be-processed image. The performing feature extraction on a to-be-processed image by using a first neural network includes: obtaining first feature information corresponding to the to-be-processed image, where the to-be-processed image includes a plurality of image blocks, and the first feature information includes feature information of the image block; sequentially inputting feature information of at least two groups of image blocks into an LIF module, to obtain target data generated by the LIF module; and obtaining, based on the target data, updated feature information of the to-be-processed image including the image block.

10 Claims, 16 Drawing Sheets

(56) References Cited

U.S. PATENT DOCUMENTS

| | | | | |
|---|---|---|---|---|
| 2017/0286828 | A1* | 10/2017 | Smith | G06N 3/049 |
| 2019/0115011 | A1* | 4/2019 | Khellah | G10L 15/02 |
| 2019/0244079 | A1* | 8/2019 | George | G06N 3/048 |
| 2019/0370598 | A1* | 12/2019 | Martin | G06V 10/462 |
| 2020/0026995 | A1* | 1/2020 | Buchanan | G06N 3/08 |
| 2020/0218959 | A1* | 7/2020 | Srinivasa | G06F 18/2148 |
| 2021/0397878 | A1* | 12/2021 | George | G06N 3/047 |
| 2023/0117659 | A1* | 4/2023 | Kwag | G06V 30/19173 706/25 |
| 2023/0154154 | A1* | 5/2023 | Kadway | G06T 7/11 382/227 |
| 2023/0229699 | A1* | 7/2023 | Wu | G06F 16/7328 |

OTHER PUBLICATIONS

A. Tavanaei and A. S. Maida, "Multi-layer unsupervised learning in a spiking convolutional neural network," 2017 International Joint Conference on Neural Networks (IJCNN), Anchorage, AK, USA, 2017, pp. 2023-2030. (Year: 2017).*

B. E. Yellakuor, A. A. Moses, Q. Zhen, O. E. Olaosebikan and Z. Qin, "A Multi-Spiking Neural Network Learning Model for Data Classification," in IEEE Access, vol. 8, pp. 72360-72371, 2020. (Year: 2020).*

Yujie Wu et al., "Direct Training for Spiking Neural Networks:Faster, Larger, Better", arxiv:1809.05793v2,Nov. 23, 2018, total 10 pages.

Dongze Lian et al.,"AS-MLP:An Axial Shifted MLP Architecture for Vision",arxiv:2107.08391v2,Mar. 17, 2022,total 19 pages.

Dian Wang,"Research on Neural Computing Model and Its Applications Based on Visual Perception",Dec. 2015,with English abstract total 60 pages.

Yifan Hu et al.,"Spiking neural networksA survey on recent advances and new directions",Jan. 2021,with English abstract total 27 pages.

Tavanaei Amirhossein et al: "Training Spiking ConvNets by STDP and Gradient Descent",2018 International Joint Conference on Neural Networks (IJCNN), IEEE, Jul. 8, 2018, total 8 pages.

* cited by examiner

IMAGE PROCESSING METHOD, NEURAL NETWORK TRAINING METHOD, AND RELATED DEVICE

CROSS-REFERENCE TO RELATED APPLICATIONS

This application is a continuation of International Application No. PCT/CN2023/082159, filed on Mar. 17, 2023, which claims priority to Chinese Patent Application No. 202210302717.6, filed on Mar. 25, 2022. The disclosures of the aforementioned applications are hereby incorporated by reference in their entireties.

TECHNICAL FIELD

This application relates to the artificial intelligence field, and in particular, to an image processing method, a neural network training method, and a related device.

BACKGROUND

Artificial intelligence (AI) is a theory, a method, a technology, and an application system for using a digital computer or a machine controlled by a digital computer to simulate, extend, and expand human intelligence, sense an environment, obtain knowledge, and use the knowledge to obtain an optimal result. In other words, artificial intelligence is a branch of computer science, and is intended to understand essence of intelligence and produce a new intelligent machine that can react in a manner similar to human intelligence. Artificial intelligence is to research design principles and implementation methods of various intelligent machines, so that the machines have perception, inference, and decision-making functions. Image processing by using artificial intelligence is a common application manner of artificial intelligence.

Currently, a spiking neural network (SNN), as a bionic neural network, has attracted extensive attention in recent years. A leaky integrate and fire (LIF) module in the spiking neural network has an advantage of fast and effective calculation.

However, the spiking neural network is mainly used to process sparse data. For example, the spiking neural network is used to process a plurality of pictures captured by a dynamic vision sensor, but the spiking neural network cannot be directly used to execute mainstream general vision tasks.

SUMMARY

Embodiments of this application provide an image processing method, a neural network training method, and a related device, so that feature extraction is performed on a single image by using an LIF module, and the LIF module can be used to execute mainstream general visual tasks.

To resolve the foregoing technical problem, embodiments of this application provide the following technical solutions.

According to a first aspect, an embodiment of this application provides an image processing method, where an artificial intelligence technology may be applied to the image processing field. The method includes: an execution device inputs a to-be-processed image into a first neural network, and performs feature extraction on the to-be-processed image by using the first neural network, to obtain feature information of the to-be-processed image. That the execution device performs feature extraction on the to-be-processed image by using the first neural network includes: The execution device obtains first feature information corresponding to the to-be-processed image, where the to-be-processed image includes a plurality of image blocks, the first feature information includes feature information of the plurality of image blocks in the to-be-processed image, and the first feature information is also the feature information of the to-be-processed image. The execution device sequentially inputs feature information of at least two groups of image blocks into an LIF module, to obtain target data generated by the LIF module, where feature information of a group of image blocks includes feature information of at least one image block. The execution device obtains second feature information corresponding to the to-be-processed image based on the target data, where the second feature information includes updated feature information of the image block, and the second feature information is updated feature information of the to-be-processed image.

In an embodiment, the feature information of the entire to-be-processed image is divided into feature information of a plurality of image blocks in the to-be-processed image, and the feature information of the plurality of image blocks may be divided into feature information of at least two groups of image blocks. The feature information of the at least two groups of image blocks is sequentially input into the LIF module, to implement leakage and integration processes of the LIF module, and obtain the target data generated by the LIF module, and then the updated feature information of the to-be-processed image is obtained based on the target data. In the foregoing manner, feature extraction is performed on a single image by using the LIF module, so that the LIF module can be used to execute mainstream general visual tasks. This helps improve efficiency and accuracy of a feature extraction process.

In an embodiment of the first aspect, that the execution device sequentially inputs feature information of at least two groups of image blocks into an LIF module, to obtain target data generated by the LIF module includes: The execution device sequentially inputs the feature information of the at least two groups of image blocks into the LIF module, and when an excitation condition of the LIF module is satisfied, generates the target data by using an activation function.

The target data is not binarized data, that is, the target data output by the LIF module may not be pulse data, that is, the target data output by the LIF module may not be two fixed values, but data with higher precision. For example, the target data may be floating-point data. In an embodiment, precision of the target data may be the same as that of the feature information of the image block, that is, a numerical level of the target data may be the same as that of the feature information of the image block.

In an embodiment, the target data output by the LIF module is non-binarized data, that is, precision of the target data output by the LIF module is improved, so that more abundant feature information of the to-be-processed image can be extracted. In this way, in a process of performing feature extraction on the to-be-processed image, an advantage of quick and effective calculation of the LIF module is retained, and more abundant feature information can be obtained.

In an embodiment of the first aspect, that the execution device sequentially inputs feature information of at least two groups of image blocks into an LIF module includes: The execution device sequentially inputs the feature information of the at least two groups of image blocks into the LIF module in a plurality of rounds. Further, the execution device inputs feature information of a group of image blocks into one LIF module in each round. In an embodiment, the first neural network may include M parallel LIF modules. In each round, the execution device may simultaneously input feature information of M groups of image blocks into the M parallel LIF modules, and process input data by using the M parallel LIF modules.

In an embodiment of the first aspect, the feature information of the at least two groups of image blocks includes feature information of a plurality of rows of image blocks, feature information of each row of image blocks includes feature information of a plurality of image blocks in a same row, and feature information of each group of image blocks includes feature information of at least one row of image blocks. In addition/alternatively, the feature information of the at least two groups of image blocks includes feature information of a plurality of columns of image blocks, feature information of each column of image blocks includes feature information of a plurality of image blocks in a same column, and feature information of each group of image blocks includes feature information of at least one column of image blocks.

In an embodiment of the first aspect, the excitation condition of the LIF module may include whether a value of a film potential in the LIF module is greater than or equal to a preset threshold. Further, because the feature information of the image block may include feature information of an image block corresponding to at least one channel, correspondingly, the excitation condition of the LIF module may include one or more thresholds, that is, threshold values corresponding to different channels may be the same or different.

In an embodiment of the first aspect, the first neural network is a multilayer perceptron MLP, a convolutional neural network, or a neural network using a self-attention mechanism, and the neural network using the self-attention mechanism may also be referred to as a transformer neural network.

In an embodiment, regardless of whether the first neural network is the MLP, the convolutional neural network, or a residual transformer neural network, the first neural network can be compatible with the LIF module by using the image processing method provided in an embodiment of the application. Because the MLP, the convolutional neural network, and the residual transformer neural network may be applied to different application scenarios, application scenarios of this solution are greatly extended and implementation flexibility is greatly improved.

In an embodiment of the first aspect, the method further includes: The execution device performs feature processing on the feature information of the to-be-processed image by using a second neural network, to obtain a prediction result corresponding to the to-be-processed image, where the first neural network and the second neural network are included in a same target neural network, and a task executed by the target neural network is any one of the following: image classification, image segmentation, performing target detection on an image, or performing super-resolution processing on an image. In embodiments of this application, a plurality of application scenarios of this solution are provided. This greatly improves implementation flexibility of this solution.

According to a second aspect, an embodiment of this application provides a neural network training method, so that an artificial intelligence technology may be applied to the image processing field. The method includes: inputting a to-be-processed image into a first neural network, performing feature extraction on the to-be-processed image by using the first neural network, to obtain feature information of the to-be-processed image, and performing feature processing on the feature information of the to-be-processed image by using a second neural network, to obtain a prediction result corresponding to the to-be-processed image; and training the first neural network and the second neural network by using a loss function based on the prediction result and a correct result that correspond to the to-be-processed image, where the loss function indicates a similarity between the prediction result and the correct result.

The performing feature extraction on the to-be-processed image by using the first neural network includes: obtaining first feature information corresponding to the to-be-processed image, where the to-be-processed image includes a plurality of image blocks, and the first feature information includes feature information of the image block; sequentially inputting feature information of at least two groups of image blocks into a leaky integrate and fire LIF module, to obtain target data generated by the LIF module, where feature information of a group of image blocks includes feature information of at least one image block; and obtaining second feature information corresponding to the to-be-processed image based on the target data, where the second feature information includes updated feature information of the image block, and both the first feature information and the second feature information are the feature information of the to-be-processed image.

In the second aspect of this application, a training device is further configured to perform the operations performed by the execution device in an embodiment of the first aspect. For implementations of the operations, meanings of terms, and brought beneficial effects in an embodiment of the second aspect of this application, refer to the first aspect. Details are not described herein again.

According to a third aspect, an embodiment of this application provides an image processing apparatus, so that an artificial intelligence technology may be applied to the image processing field. The image processing apparatus includes: an input unit, configured to input a to-be-processed image into a first neural network; and a feature extraction unit, configured to perform feature extraction on the to-be-processed image by using the first neural network, to obtain feature information of the to-be-processed image.

The feature extraction unit includes: an obtaining subunit, configured to obtain first feature information corresponding to the to-be-processed image, where the to-be-processed image includes a plurality of image blocks, and the first feature information includes feature information of the image block; and a generation subunit, configured to sequentially input feature information of at least two groups of image blocks into a leaky integrate and fire LIF module, to obtain target data generated by the LIF module, where feature information of a group of image blocks includes feature information of at least one image block. The obtaining subunit is configured to obtain second feature information corresponding to the to-be-processed image based on the target data, where the second feature information includes updated feature information of the image block, and both the first feature information and the second feature information are the feature information of the to-be-processed image.

In the third aspect of this application, the image processing apparatus is further configured to perform the operations performed by the execution device in an embodiment of the first aspect. For implementations of the operations, meanings of terms, and brought beneficial effects in an embodiment of the third aspect of this application, refer to the first aspect and an embodiment of the first aspect. Details are not described herein again.

According to a fourth aspect, an embodiment of this application provides a neural network training apparatus, so that an artificial intelligence technology may be applied to the image processing field. The neural network training apparatus includes: a feature extraction unit, configured to: input a to-be-processed image into a first neural network, and perform feature extraction on the to-be-processed image by using the first neural network, to obtain feature information of the to-be-processed image; a feature processing unit, configured to perform feature processing on the feature information of the to-be-processed image by using a second neural network, to obtain a prediction result corresponding to the to-be-processed image; and a training unit, configured to train the first neural network and the second neural network by using a loss function based on the prediction result and a correct result that correspond to the to-be-processed image, where the loss function indicates a similarity between the prediction result and the correct result.

The feature extraction unit includes: an obtaining subunit, configured to obtain first feature information corresponding to the to-be-processed image, where the to-be-processed image includes a plurality of image blocks, and the first feature information includes feature information of the image block; and a generation subunit, configured to sequentially input feature information of at least two groups of image blocks into a leaky integrate and fire LIF module, to obtain target data generated by the LIF module, where feature information of a group of image blocks includes feature information of at least one image block. The obtaining subunit is further configured to obtain second feature information corresponding to the to-be-processed image based on the target data, where the second feature information includes updated feature information of the image block, and both the first feature information and the second feature information are the feature information of the to-be-processed image.

In the fourth aspect of this application, the image processing apparatus is further configured to perform the operations performed by the execution device in an embodiment of the fourth aspect. For implementations of the operations, meanings of terms, and brought beneficial effects in an embodiment of the third aspect of this application, refer to the second aspect and an embodiment of the second aspect. Details are not described herein again.

According to a fifth aspect, an embodiment of this application provides a computer program product. The computer program product includes a program, and when the program is run on a computer, the computer is enabled to perform the method according to the first aspect or the second aspect.

According to a sixth aspect, an embodiment of this application provides a computer-readable storage medium. The computer-readable storage medium stores a computer program, and when the program is run on a computer, the computer is enabled to perform the method according to the first aspect or the second aspect.

According to a seventh aspect, an embodiment of this application provides an execution device, including a processor and a memory. The processor is coupled to the memory, the memory is configured to store a program, and the processor is configured to execute the program in the memory, so that the execution device performs the image processing method according to the first aspect.

According to an eighth aspect, an embodiment of this application provides a training device, including a processor and a memory. The processor is coupled to the memory, the memory is configured to store a program, and the processor is configured to execute the program in the memory, so that the training device performs the neural network training processing method according to the second aspect.

According to a ninth aspect, an embodiment of this application provides a chip system. The chip system includes a processor, and is configured to support a terminal device or a communication device in implementing functions in the foregoing aspects, for example, sending or processing data and/or information in the foregoing method. In an embodiment, the chip system further includes a memory. The memory is configured to store a program instruction and data that are necessary for the terminal device or the communication device. The chip system may include a chip, or may include a chip and another discrete component.

DESCRIPTION OF EMBODIMENTS

Embodiments of this application provide an SIMD instruction generation and processing method and a related device, to select information about a second SIMD instruction model from a plurality of groups of information about a first SIMD instruction model based on a length of each loop dimension of a tensor formula, and further generate, based on the second SIMD instruction model, a first SIMD instruction obtained after a first tensor formula is converted, to greatly improve efficiency of an SIMD instruction generation process.

The following describes embodiments of this application with reference to the accompanying drawings. One of ordinary skilled in the art may learn that, with development of technologies and emergence of a new scenario, the technical solutions provided in embodiments of this application are also applicable to a similar technical problem.

In the specification, claims, and accompanying drawings of this application, the terms "first", "second", and so on are intended to distinguish between similar objects but do not necessarily indicate an order or sequence. It should be understood that the terms used in such a way are interchangeable in proper circumstances, which is merely a discrimination manner that is used when objects having a same attribute are described in embodiments of this application. In addition, the terms "include", "have", and any other variants thereof mean to cover the non-exclusive inclusion, so that a process, method, system, product, or device that includes a series of units is not necessarily limited to those units, but may include other units not expressly listed or inherent to such a process, method, product, or device.

Figure 1A:
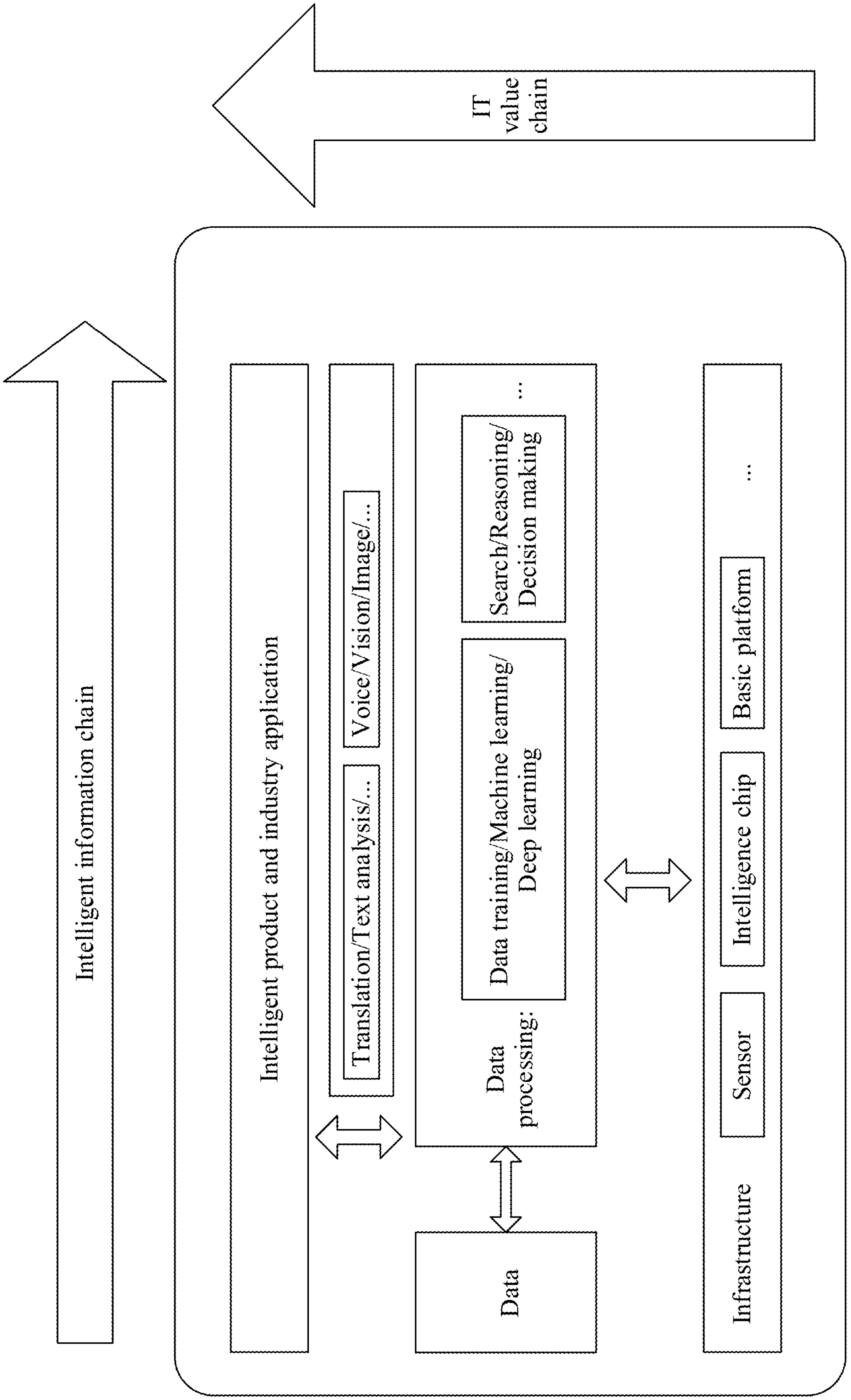
FIG. 1*a* is a schematic diagram of a structure of a main artificial intelligence framework according to an embodiment of this application.

An overall working procedure of an artificial intelligence system is first described. FIG. 1*a* shows a schematic diagram of a structure of a main artificial intelligence framework. The following describes the main artificial intelligence framework from two dimensions: an "intelligent information chain" (horizontal axis) and an "IT value chain" (vertical axis). The "intelligent information chain" reflects a series of processes from obtaining data to processing the data. For example, the process may be a general process of intelligent information perception, intelligent information representation and formation, intelligent inference, intelligent decision making, and intelligent execution and output. In this process, the data undergoes a refinement process of "data-information-knowledge-intelligence". The "IT value chain" reflects a value brought by artificial intelligence to the information technology industry from an underlying infrastructure and information (technology providing and processing implementation) of artificial intelligence to an industrial ecological process of a system.

(1) Infrastructure

The infrastructure provides computing capability support for the artificial intelligence system, implements communication with the external world, and implements support by using a basic platform. The infrastructure communicates with the external world by using a sensor. A computing capability is provided by intelligent chips. The intelligent chips may be hardware acceleration chips such as a central processing unit (CPU), an embedded neural-network processing unit (NPU), a graphics processing unit (GPU), an application-specific integrated circuit (ASIC), or a field-programmable gate array (FPGA). The basic platform includes related platform assurance and support such as a distributed computing framework and a network, and may include cloud storage and computing, an interconnection and interworking network, and the like. For example, the sensor communicates with the outside to obtain data, and the data is provided to an intelligent chip in a distributed computing system provided by the basic platform for computing.

(2) Data

Data at an upper layer of the infrastructure indicates a data source in the artificial intelligence field. The data relates to a graph, an image, a speech, and a text, further relates to internet of things data of a conventional device, and includes service data of an existing system and perception data, for example, force, displacement, a liquid level, a temperature, and humidity.

(3) Data Processing

Data processing usually includes data training, machine learning, deep learning, searching, inference, decision making, and the like.

Machine learning and deep learning may mean performing symbolic and formal intelligent information modeling, extraction, preprocessing, training, and the like on data.

Inference is a process in which human intelligent inference is simulated in a computer or an intelligent system, and machine thinking and problem resolving are performed by using formal information according to an inference control policy. A typical function is searching and matching.

Decision making is a process of making a decision after intelligent information is inferred, and usually provides functions such as classification, ranking, and prediction.

(4) General Capability

After data processing mentioned above is performed on the data, some general capabilities may further be formed based on a data processing result. For example, the general capabilities may be an algorithm or a general system, for example, translation, text analysis, computer vision processing, speech recognition, and image recognition.

(5) Intelligent Product and Industry Application

The intelligent product and the industry application are a product and an application of the artificial intelligence system in various fields, and are encapsulation for an overall solution of artificial intelligence, to productize intelligent information decision making and implement the application. Application fields thereof mainly include an intelligent terminal, intelligent manufacturing, intelligent transportation, a smart home, intelligent healthcare, intelligent security protection, autonomous driving, a smart city, and the like.

Embodiments of this application may be applied to various application fields in the artificial intelligence field, and may be applied to executing image processing tasks in various application fields. The tasks include but are not limited to: performing feature extraction on an image, image classification, image segmentation, performing target detection on an image, performing super-resolution processing on an image, or another type of task. This is not exhaustively listed herein.

Figure 1B:
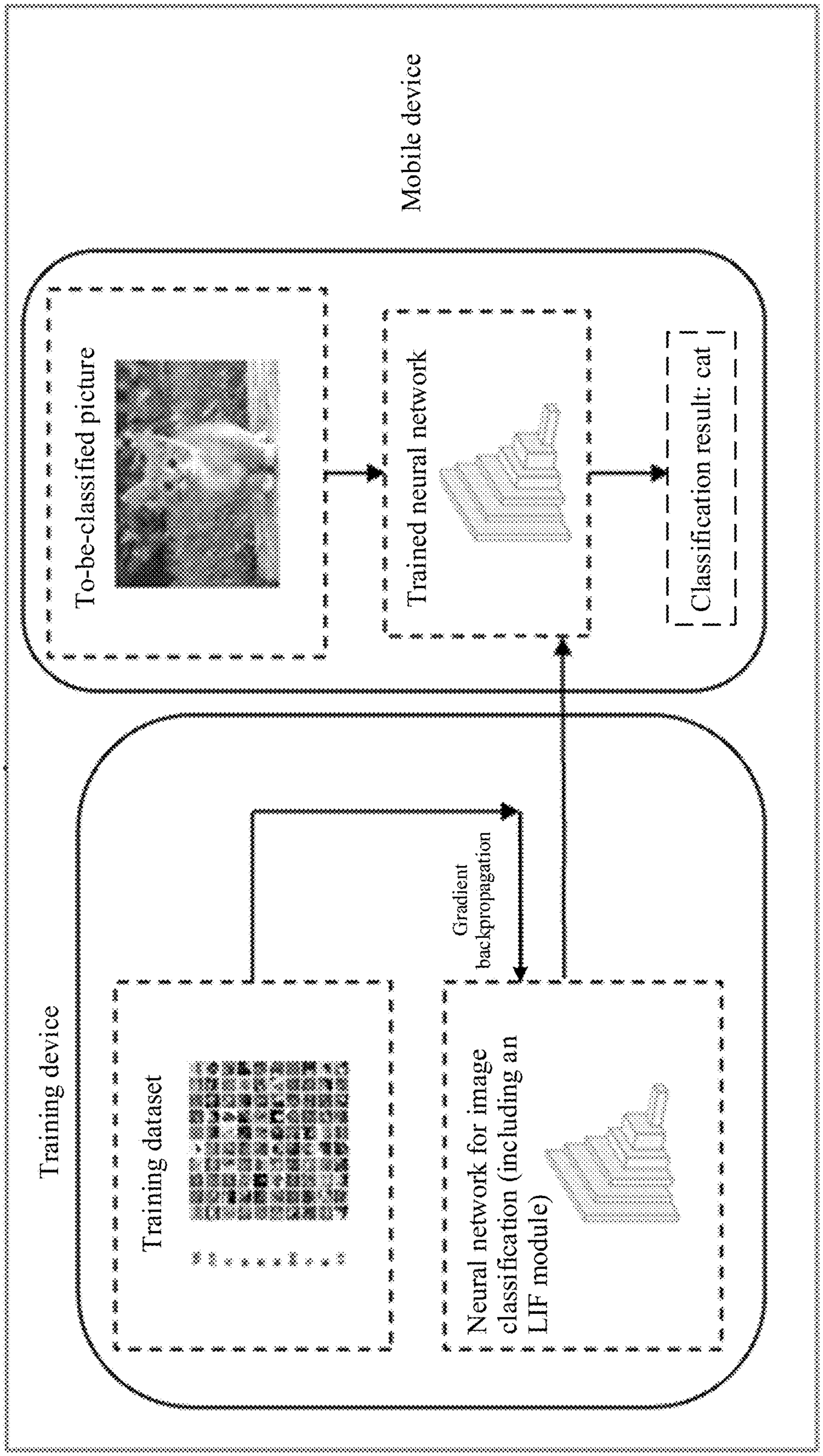
FIG. 1*b* is a diagram of an application scenario of an image processing method according to an embodiment of this application.

For example, in the field of intelligent terminals, smart homes, or intelligent security protection, or another application field, there may be a requirement for performing image classification by using a neural network. For more intuitive understanding of this solution, FIG. 1*b* is a diagram of an application scenario of an image processing method according to an embodiment of this application. In FIG. 1*b*, an example in which a target neural network is applied to the field of intelligent terminals is used. In a training phase, a training device performs iterative training on a neural network used for image classification by using a training dataset. In each training process, the training device back-propagates a gradient value to update a weight parameter of the neural network. After a training operation is performed on the target neural network, the trained neural network may be sent to a mobile device, so that graphic classification is performed by using the neural network. It should be understood that the example in FIG. 1*b* is merely intended to facilitate understanding of this solution rather than limiting this solution.

In another example, for example, in the autonomous driving field, there may be a requirement for performing target detection on a captured image by using a neural network, that is, inputting a to-be-processed image captured by an autonomous vehicle into the neural network, to obtain a category and a location of at least one object in the to-be-processed image output by the neural network.

In another example, for example, in the field of intelligent terminals, an image retouching application may provide a function of performing image segmentation on an input image, that is, inputting a to-be-processed image into a neural network, to obtain a category of each pixel in the to-be-processed image output by the neural network. The category of each pixel is a foreground or a background.

In another example, for example, in the fields such as intelligent security protection and a smart city, there may be a requirement for performing super-resolution processing on a captured image, that is, inputting an image captured by a monitoring device into a neural network, to obtain a processed image output by the neural network. The processed image has higher resolution.

In another example, for example, in the fields of intelligent terminals and intelligent security protection, there may be a requirement for performing facial recognition based on a captured image. In this case, feature extraction needs to be performed on a captured image of a user by using a neural network, so that extracted feature information may be matched with pre-registered feature information, to determine whether the current user is a registered user.

It should be noted that the graphics processing method provided in an embodiment of the application may be further applied to another application scenario. This is not exhaustively listed herein. In the foregoing application scenarios, in each process of processing an image by using a neural network, feature extraction needs to be first performed on an input image. To apply an LIF module to a feature extraction process of a single image, an embodiment of this application provides an image processing method.

Figure 2A:
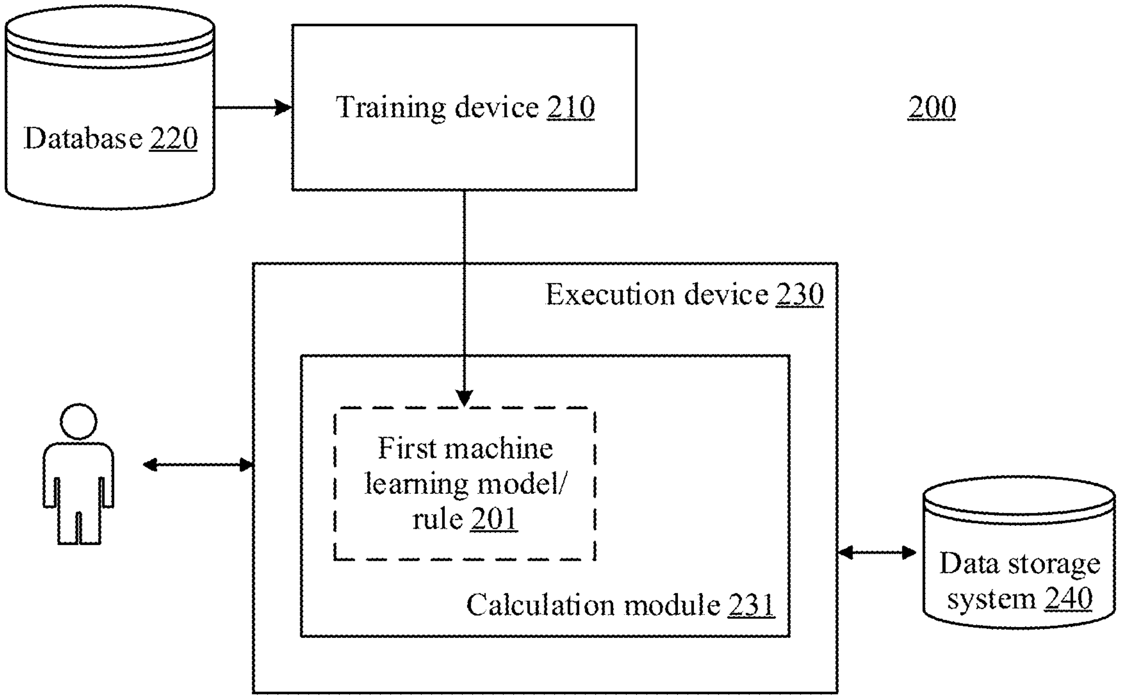
FIG. 2*a* is a diagram of a system architecture of an image processing system according to an embodiment of this application.

The following first describes an image processing system in an embodiment of this application with reference to FIG. 2*a*. FIG. 2*a* is a diagram of a system architecture of an image processing system according to an embodiment of this application. In FIG. 2*a*, an image processing system 200 includes a training device 210, a database 220, an execution device 230, and a data storage system 240. The execution device 230 includes a calculation module 231.

The database 220 stores a training data set. The training device 210 generates a first model/rule 201, performs iterative training on the first model/rule 201 by using the training data set, to obtain a trained first model/rule 201, and deploys the trained first model/rule 201 to the calculation module 231 of the execution device 230. The first model/rule 201 may be represented as a neural network, or may be represented as a non-neural network model. In an embodiment of the application, only an example in which the first model/rule 201 is represented as a neural network is used for description.

The execution device 230 may be represented as different systems or devices, for example, a mobile phone, a tablet, a notebook computer, a virtual reality (VR) device, or a monitoring system. The execution device 230 may invoke data, code, and the like in the data storage system 240, or may store data, instructions, and the like in the data storage system 240. The data storage system 240 may be disposed in the execution device 230, or the data storage system 240 may be an external memory relative to the execution device 230.

In some embodiments of this application, refer to FIG. 2*a*. The execution device 230 may directly interact with a "user". It should be noted that FIG. 2*a* is merely a schematic diagram of an architecture of two image processing systems according to an embodiment of the present disclosure, and a location relationship between devices, components, modules, and the like shown in the figure does not constitute any limitation. For example, in some other embodiments of this application, the execution device 230 and a client device may be independent devices. The execution device 230 is configured with an input/output (I/O) interface, and exchanges data with the client device. The "user" may input a to-be-processed image to the I/O interface by using the client device. The execution device 230 returns a processing result to the client device through the I/O interface, and provides the processing result to the user.

Figure 2B:
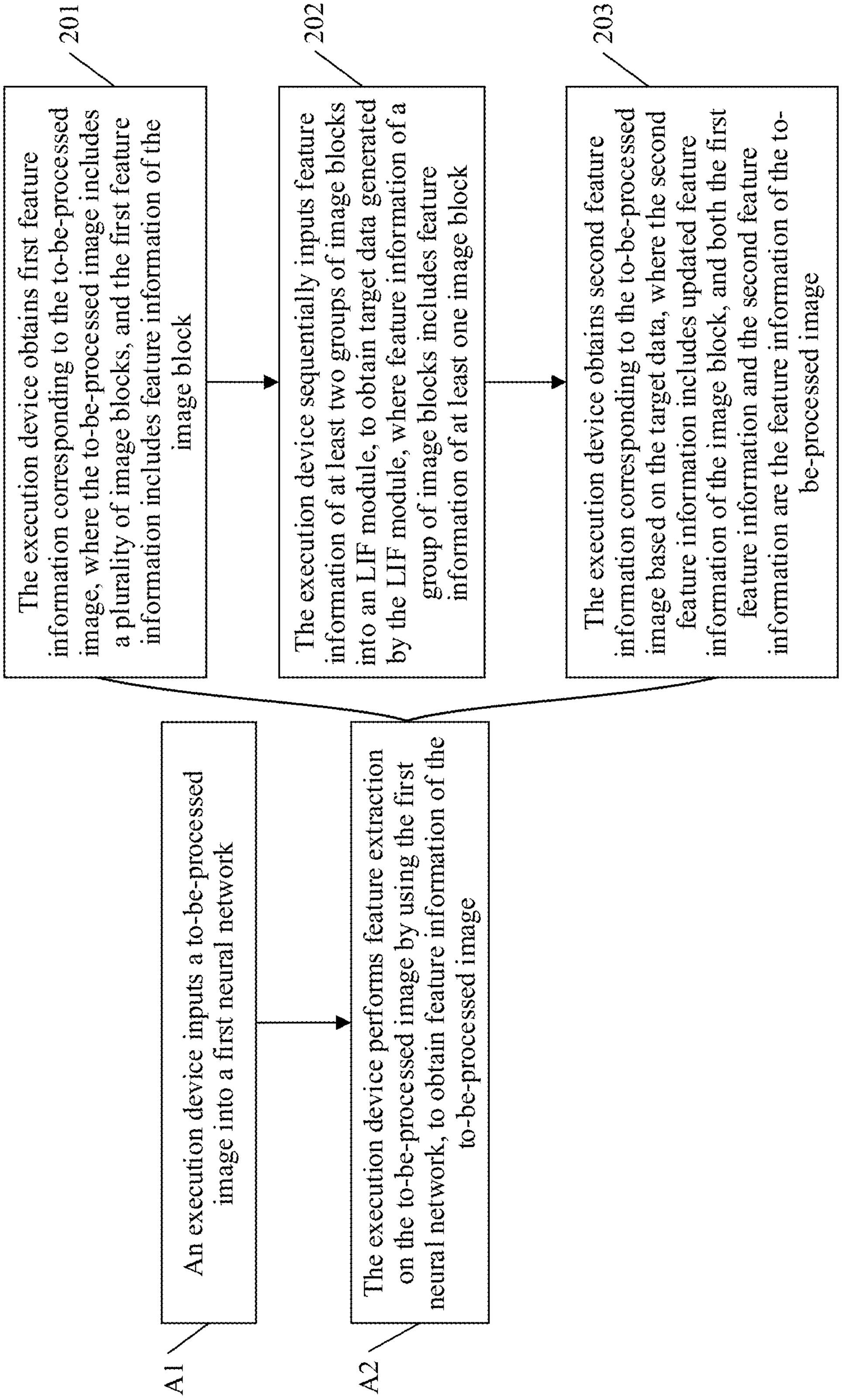
FIG. 2*b* is a schematic flowchart of an image processing method according to an embodiment of this application.

With reference to the foregoing description, FIG. 2*b* is a schematic flowchart of a graphics processing method according to an embodiment of this application. A1: An execution device inputs a to-be-processed image into a first neural network. A2: The execution device performs feature extraction on the to-be-processed image by using the first neural network, to obtain feature information of the to-be-processed image. Operation A2 may include: 201: The execution device obtains first feature information corresponding to the to-be-processed image, where the to-be-processed image includes a plurality of image blocks, and the first feature information includes feature information of the image block. 202: The execution device sequentially inputs feature information of at least two groups of image blocks into an LIF module, to obtain target data generated by the LIF module, where feature information of a group of image blocks includes feature information of at least one image block. 203: The execution device obtains second feature information corresponding to the to-be-processed image based on the target data, where the second feature information includes updated feature information of the image block, and both the first feature information and the second feature information are the feature information of the to-be-processed image.

In an embodiment, the feature information of the at least two groups of image blocks is sequentially input into the LIF module, to implement leakage and integration processes of the LIF module, and obtain the target data generated by the LIF module, and then the updated feature information of the to-be-processed image is obtained based on the target data. In the foregoing manner, feature extraction is performed on a single image by using the LIF module, so that the LIF module can be used to execute mainstream general visual tasks.

With reference to the foregoing description, the following starts to describe implementation procedures of an inference phase and a training phase of the image processing method provided in embodiments of this application.

1. Inference Phase

Figure 3:
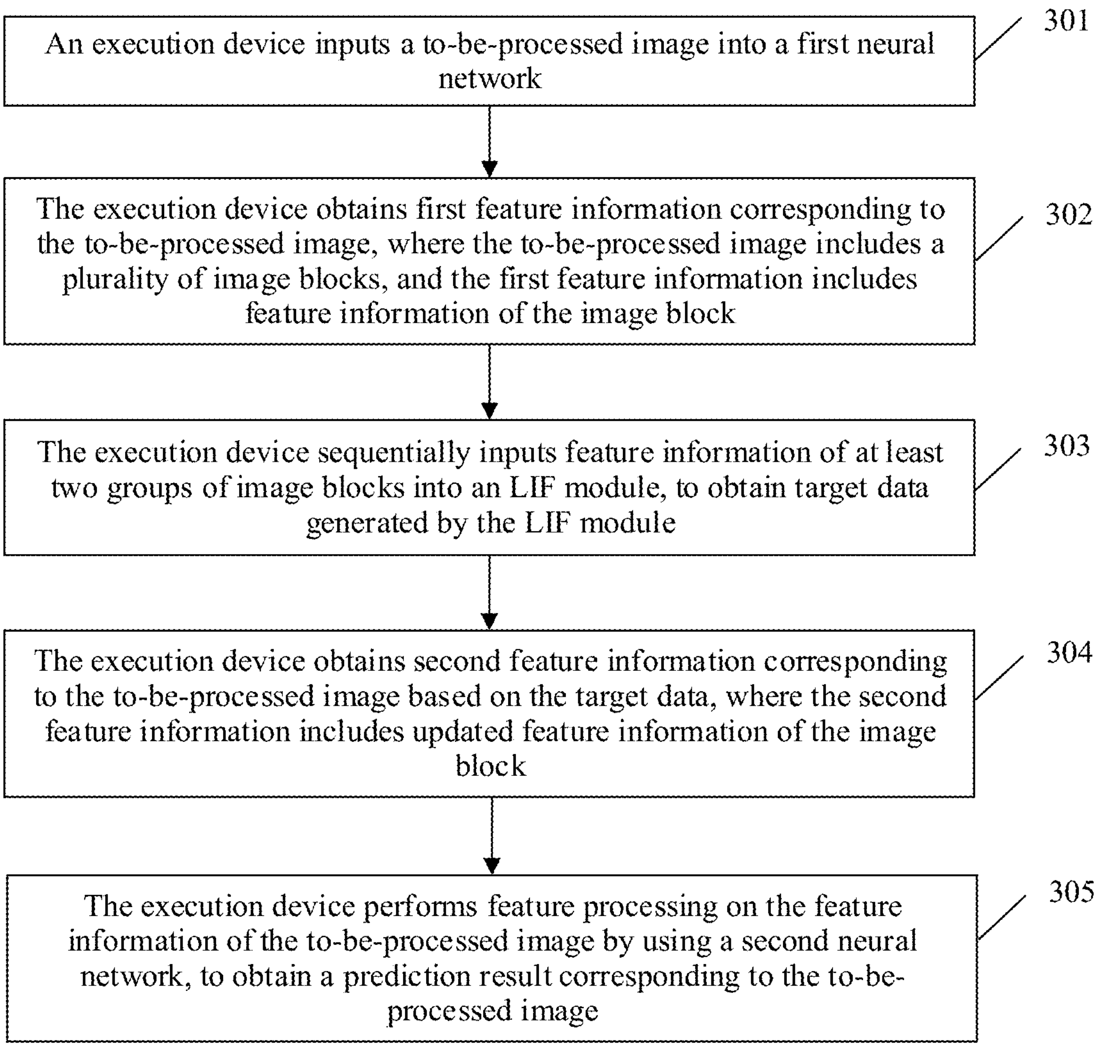
FIG. 3 is a schematic flowchart of an image processing method according to an embodiment of this application.

In an embodiment of the application, FIG. 3 is a schematic flowchart of an image processing method according to an embodiment of this application. The image processing method provided in an embodiment of the application may include the following operations.

301: An execution device inputs a to-be-processed image into a first neural network.

In an embodiment of the application, after obtaining the to-be-processed image, the execution device may input the to-be-processed image into the first neural network, and perform feature extraction on the to-be-processed image by using the first neural network, to obtain feature information of the to-be-processed image.

The first neural network may be represented as a multi-layer perceptron (MLP), a convolutional neural network (CNN), a neural network using a self-attention mechanism, or another type of neural network. The neural network using the self-attention mechanism may also be referred to as a transformer neural network, and may be determined flexibly based on an actual application scenario. This is not limited herein.

Figure 4:
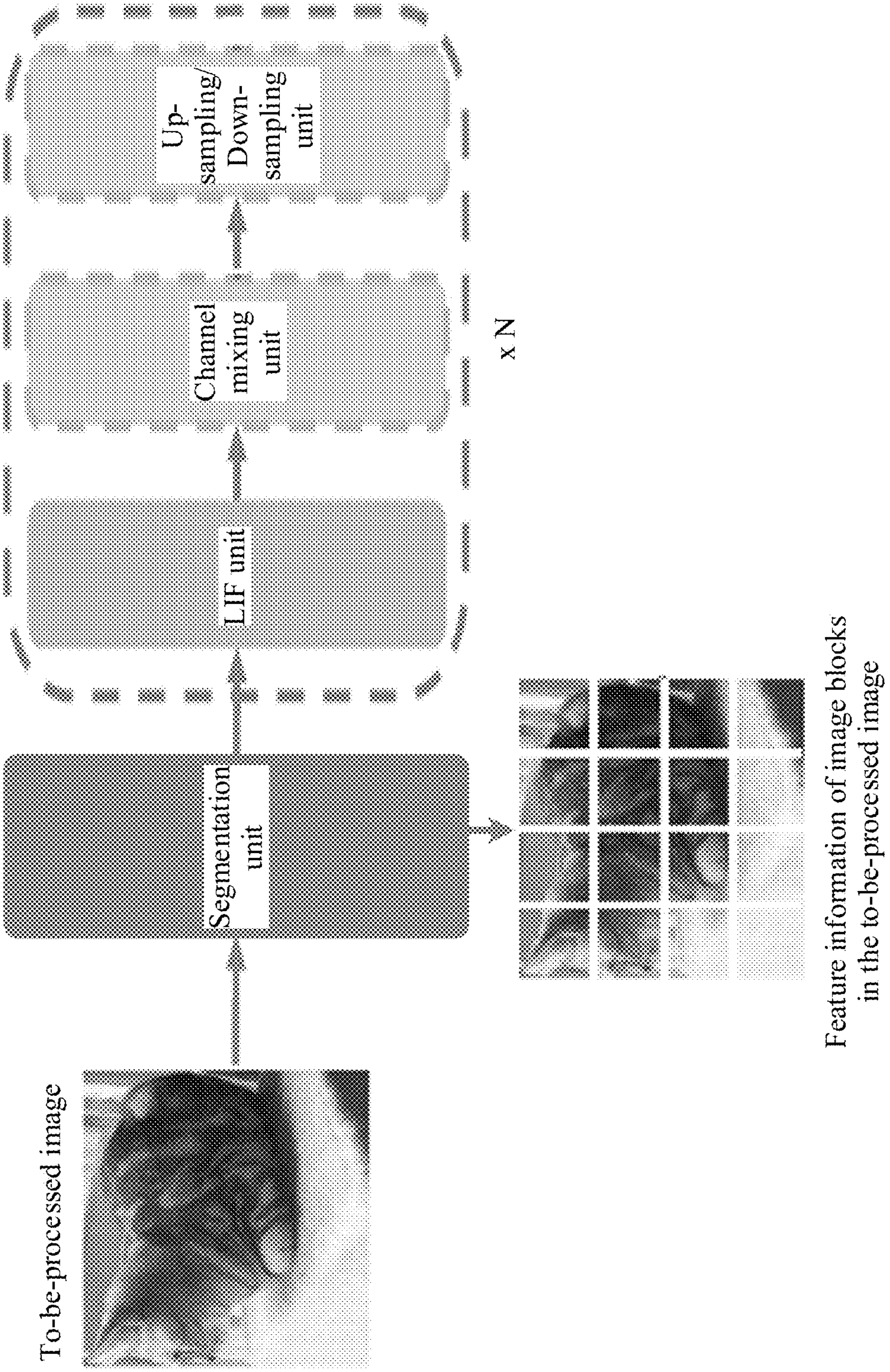
FIG. 4 is a schematic diagram of a structure of a first neural network in an image processing method according to an embodiment of this application.

For more intuitive understanding of this solution, the following first describes an overall architecture of the first neural network with reference to FIG. 4. FIG. 4 is a schematic diagram of a structure of the first neural network in the image processing method according to an embodiment of this application. As shown in FIG. 4, the first neural network may include a segmentation unit and an LIF unit. In an embodiment, the first neural network may further include a channel mixing unit and an up-sampling/a down-sampling unit.

The segmentation unit in the first neural network is configured to perform feature extraction and segmentation on the to-be-processed image, to obtain initial feature information (embedding) of a plurality of image blocks (patch) included in the to-be-processed image. Because the plurality of image blocks form the to-be-processed image, the feature information of the plurality of image blocks is the feature information of the to-be-processed image. The segmentation operation is used to divide the to-be-processed image into a plurality of image blocks, and an execution sequence of the feature extraction operation and the segmentation operation may be flexibly determined based on an actual application scenario. It should be noted that the feature information of the plurality of image blocks shown in FIG. 4 is merely intended to facilitate understanding of a relationship between the plurality of image blocks and the to-be-processed image. In an actual situation, the feature information of the plurality of image blocks is represented in a form of data.

The LIF unit in the first neural network is configured to update the feature information of the image block. The LIF unit includes at least the LIF module in an embodiment of the application. The LIF unit may further include another neural network layer. An implementation process of the LIF unit is described in detail in the following operations 302 to 304.

The channel mixing unit in the first neural network is also configured to update the feature information of the image block. Both the up-sampling unit and the down-sampling unit are configured to change a size of the feature information of the to-be-processed image. The up-sampling unit is configured to perform an up-sampling operation on the feature information of the image block, to scale up the feature information of the image block. The down-sampling unit is configured to perform a down-sampling operation on the feature information of the image block, to scale down the feature information of the image block.

It should be noted that in actual application, the first neural network may include more or fewer units, locations of the LIF unit and the channel mixing unit may be adjusted, and quantities of the LIF unit, the channel mixing unit, and the up-sampling/down-sampling unit may be the same or different, provided that there is the LIF unit in the first neural network. The first neural network shown in FIG. 4 is merely an example intended to facilitate understanding of this solution rather than limiting this solution.

302: The execution device obtains first feature information corresponding to the to-be-processed image, where the to-be-processed image includes a plurality of image blocks, and the first feature information includes feature information of the image block.

In an embodiment of the application, before updating the initial feature information of the plurality of image blocks by using the LIF module, the execution device may first obtain the first feature information corresponding to the to-be-processed image. The to-be-processed image includes the plurality of image blocks, and the first feature information includes the feature information of the plurality of image blocks.

Further, the first feature information may include initial feature information of each image block, or may be updated feature information of each image block.

In an embodiment, after obtaining the first feature information corresponding to the to-be-processed image, the execution device may perform a convolution operation on the feature information of the plurality of image blocks again by using a convolutional neural network layer, to update the feature information of the image block, and obtain updated first feature information. The convolutional neural network layer may be represented as a depthwise separable convolution layer (depth wise convolution) or another type of convolutional neural network layer. When the depthwise separable convolution layer is selected, a calculation amount of the foregoing convolution operation can be reduced.

303: The execution device sequentially inputs feature information of at least two groups of image blocks into the LIF module, to obtain target data generated by the LIF module.

In an embodiment of the application, after obtaining the feature information (that is, the first feature information or the updated first feature information) of the plurality of image blocks included in the to-be-processed image, the execution device may divide the feature information of the plurality of image blocks included in the to-be-processed image into the feature information of the at least two groups of image blocks, and sequentially input the feature information of the at least two groups of image blocks into the LIF module, to implement leakage and integration processes of the LIF module, and obtain the target data generated by the LIF module. Feature information of a group of image blocks includes feature information of at least one image block.

In an embodiment, the execution device may sequentially input the feature information of the at least two groups of image blocks into the LIF module, and when an excitation condition of the LIF module is satisfied, generate the target data by using an activation function.

The target data may be binarized data, that is, the target data output by the LIF module may be two preset values. Alternatively, the target data may be non-binarized data, that is, the target data output by the LIF module may not be pulse data, that is, the target data output by the LIF module may not be two fixed values, but data with higher precision. For example, the target data may be floating-point data. In an embodiment, precision of the target data may be the same as that of the feature information of the image block, that is, a numerical level of the target data may be the same as that of the feature information of the image block.

In an embodiment of the application, the target data output by the LIF module is the non-binarized data, that is, precision of the target data output by the LIF module is improved, so that more abundant feature information of the to-be-processed image can be extracted. In this way, in a process of performing feature extraction on the to-be-processed image, an advantage of quick and effective calculation of the LIF module is retained, and more abundant feature information can be obtained.

For a concept of the feature information of the at least two groups of image blocks, the to-be-processed image may include two direction dimensions: a horizontal dimension and a vertical dimension. Correspondingly, the to-be-processed image may be segmented in the two direction dimensions, namely, the horizontal and vertical dimensions, that is, the feature information of the plurality of image blocks may include feature information of a plurality of image blocks in the horizontal dimension and feature information of a plurality of image blocks in the vertical dimension.

Figure 5:
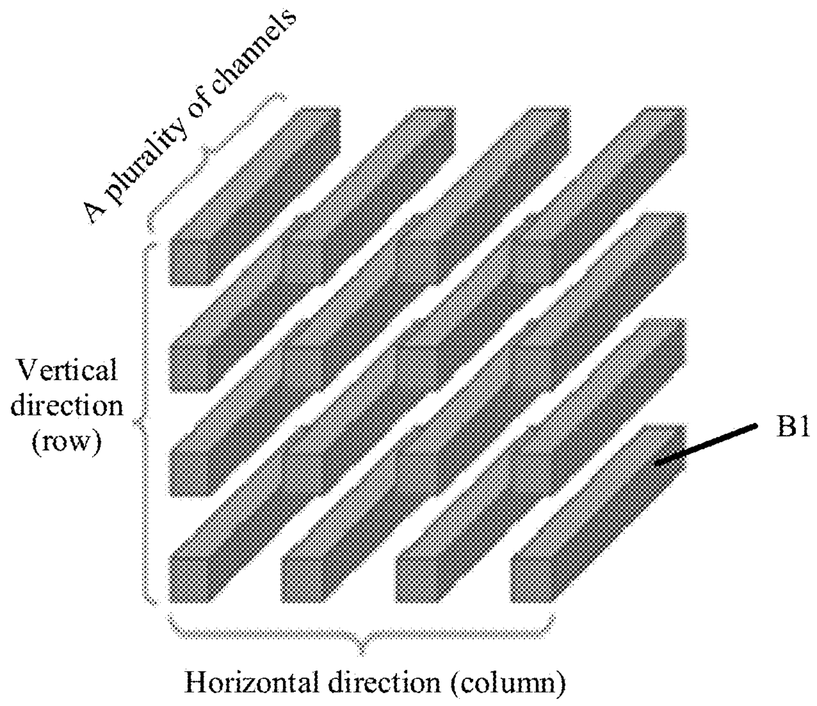
FIG. 5 is a schematic diagram of feature information of a plurality of image blocks in an image processing method according to an embodiment of this application.

For more intuitive understanding of this solution, FIG. 5 is a schematic diagram of feature information of a plurality of image blocks in the image processing method according to an embodiment of this application. One B1 in FIG. 5 may represent feature information of one image block. In FIG. 5, an example in which to-be-processed feature information includes feature information of 16 image blocks is used. Feature information of one image block may include feature information of at least one channel corresponding to one image block. In FIG. 5, an example in which the feature information of one image block includes feature information of a plurality of channels corresponding to one image block is used. Different channels may correspond to a same type or different types of information. For example, one channel may be used to obtain any one of the following information: a color, a texture, brightness, or other information. This is not limited herein.

As shown in FIG. 5, the feature information of the to-be-processed image may include the feature information of the plurality of image blocks in the horizontal direction dimension and the feature information of the plurality of image blocks in the vertical direction dimension, that is, include feature information of a plurality of rows of image blocks and feature information of a plurality of columns of image blocks. It should be understood that the example in FIG. 5 is merely intended to facilitate understanding of a concept of feature information of a plurality of image blocks rather than limiting this solution.

The execution device may determine feature information of one or more rows of image blocks as feature information of a group of image blocks, or the execution device may determine feature information of one or more columns of image blocks as feature information of a group of image blocks, to divide the feature information of the plurality of image blocks into the feature information of the at least two groups of image blocks.

Figure 6:
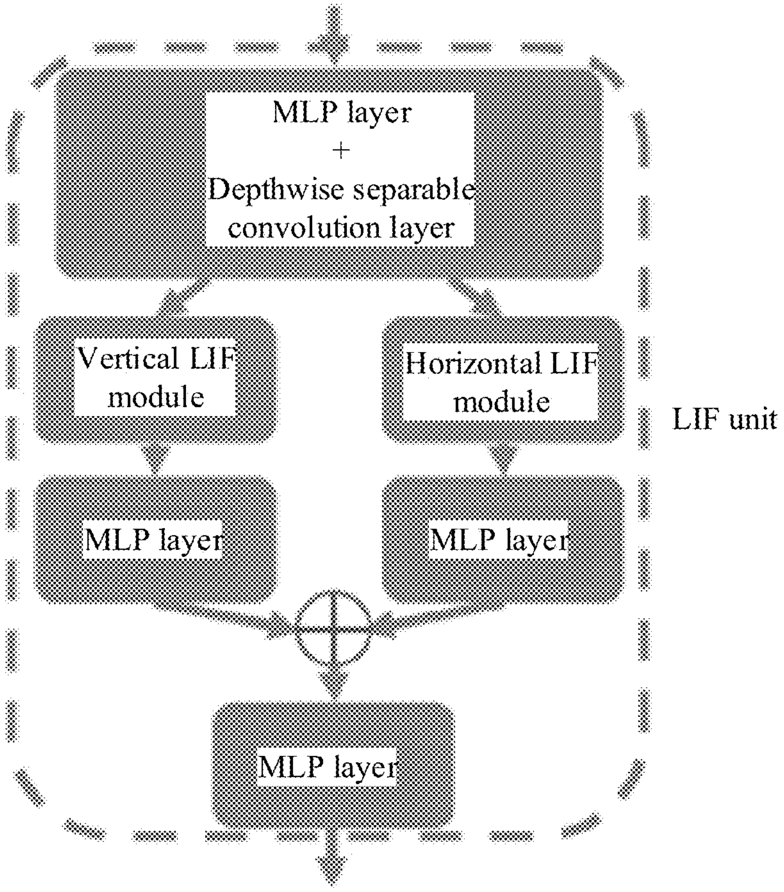
FIG. 6 is a schematic diagram of an LIF unit in a first neural network in an image processing method according to an embodiment of this application.

For a process of sequentially inputting the feature information of the at least two groups of image blocks into the LIF module, one LIF unit in the first neural network may have one or more LIF modules. For more intuitive understanding of this solution, refer to FIG. 6 to FIG. 8. FIG. 6 is a schematic diagram of the LIF unit in the first neural network in the image processing method according to an embodiment of this application. In FIG. 6, an example in which the first neural network is represented as an MLP is used. As shown in the figure, one LIF unit may include a plurality of MLP layers, one depthwise separable convolution layer, one vertical LIF module, and one horizontal LIF module.

The MLP layer is a neural network layer including at least one fully connected neuron. If the first neural network is represented as the convolutional neural network, the MLP layer may be replaced with the convolutional neural network layer. If the first neural network is represented as the transformer neural network, the MLP layer may be replaced with the transformer neural network layer. Further, the convolutional neural network layer is a neural network layer including at least one partially connected neuron, and the transformer neural network layer is a neural network layer that introduces an attention mechanism.

Figure 7:
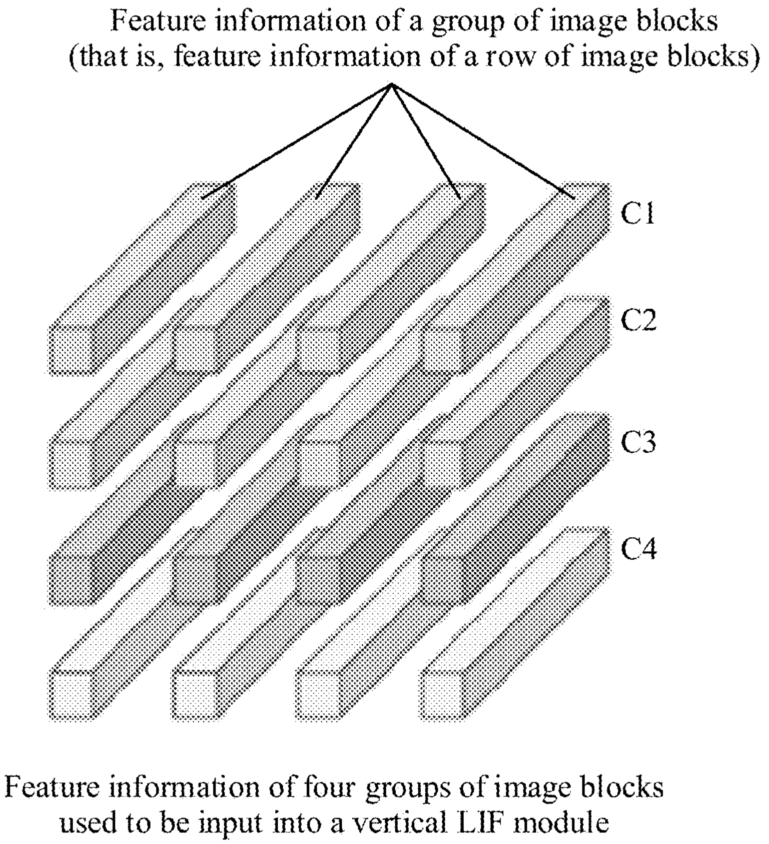
FIG. 7 is a schematic diagram of feature information of a group of image blocks in an image processing method according to an embodiment of this application.

Feature information of each group of image blocks obtained by the vertical LIF module includes feature information of at least one row of image blocks. For more intuitive understanding of this solution, FIG. 7 is a schematic diagram of the feature information of a group of image blocks in the image processing method according to an embodiment of this application. As shown in FIG. 7, C1, C2, C3, and C4 respectively represent feature information of four groups of image blocks, that is, feature information of a plurality of image blocks is divided into four groups in a vertical direction, and feature information of each group of image blocks includes feature information of a row of image blocks. It should be understood that the example in FIG. 7 is merely intended to facilitate understanding of this solution rather than limiting this solution.

Figure 8:
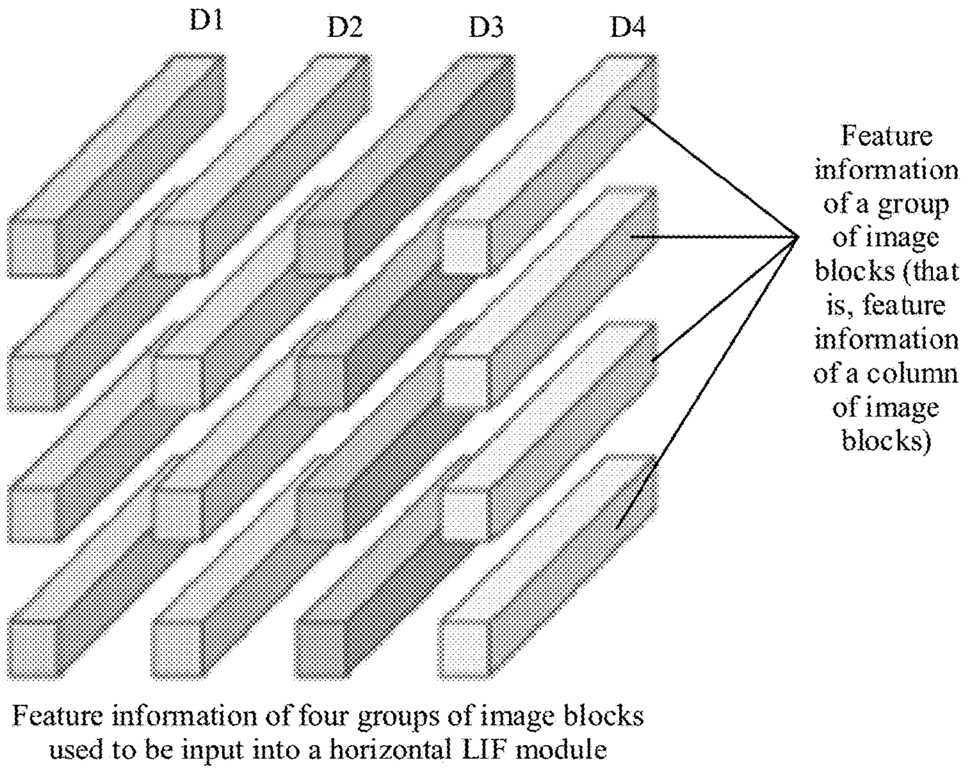
FIG. 8 is a schematic diagram of feature information of a group of image blocks in an image processing method according to an embodiment of this application.

Feature information of each group of image blocks acquired by the horizontal LIF module includes feature information of at least one column of image blocks, that is, feature information of a plurality of image blocks is grouped in a horizontal direction, and at least two obtained groups are sequentially input to the horizontal LIF module. For more intuitive understanding of this solution, FIG. 8 is a schematic diagram of feature information of a group of image blocks in the image processing method according to an embodiment of this application. As shown in FIG. 8, D1, D2, D3, and D4 respectively represent feature information of four groups of image blocks, that is, feature information of a plurality of image blocks is divided into four groups in the horizontal direction, and the feature information of each group of image blocks includes feature information of a column of image blocks. It should be understood that the example in FIG. 8 is merely intended to facilitate understanding of this solution rather than limiting this solution.

It should be noted that one LIF unit in the first neural network may include more or fewer neural network layers. The example in FIG. 6 is merely intended to facilitate understanding of this solution rather than limiting this solution.

In an embodiment, if the first neural network includes the vertical LIF module, the execution device may group the feature information of the plurality of image blocks in the vertical direction, and sequentially input obtained feature information of at least two groups of image blocks into the vertical LIF module, that is, input feature information of a group of image blocks into the vertical LIF module each time.

Each time after inputting feature information of at least one row of image blocks (that is, feature information of a group of image blocks) into the vertical LIF module, the execution device determines whether an excitation condition of the vertical LIF module is satisfied. If a determining result is that the excitation condition of the vertical LIF module is not satisfied, the vertical LIF module may not generate any value. If a determining result is that the excitation condition of the vertical LIF module is satisfied, the vertical LIF module may generate the target data by using the activation function, and reset a film potential of the vertical LIF module to 0. The execution device continues to input feature information of a next group of image blocks into the vertical LIF module, to leak and integrate the feature information of the two groups of image blocks. The execution device repeatedly performs the foregoing operations, to complete processing feature information of all the image blocks by using the vertical LIF module.

For further understanding of this solution, the following discloses a formula of a implementation of the LIF module:

$$u_{t+1}^n = \tau u_t^n(1 - o_t^n) + y_{t+1}^n \tag{1}$$

τ represents a leakage parameter of the LIF module, and is a hyperparameter; when a value of $$u_{t+1}^n$$

is greater than $V_{th}$, a value of $$o_t^n$$

is 1; when a value of $$u_{t+1}^n$$

is less than or equal to $V_{th}$, a value of $$o_t^n$$

is 0; $V_{th}$ represents the excitation condition of the LIF module, $$y_{t+1}^n$$

represents an $n^{th}$ value in feature information of a group of image blocks input into the LIF module in a current round (that is, a $(t+1)^{th}$ round);

$$u_t^n$$

represents a film potential of the LIF module in a previous round (that is, a $t^{th}$ round); and $$u_{t+1}^n$$

represents a film potential of the LIF module in the current round. When the excitation condition of the LIF module is satisfied, the LIF module generates $$r_{t+1}^n,$$

and a calculation formula of $$r_{t+1}^n$$

is as follows:

$$r_{t+1}^n = ReLU(u_{t+1}^n - V_{th}) + V_{th} \tag{2}$$

$$u_{t+1}^n$$

and $V_{th}$ may be understood with reference to the foregoing description. ReLU is an example of the activation function. It should be understood that the examples in formula (1) and formula (2) are merely intended to facilitate understanding of this solution rather than limiting this solution.

Further, data sizes of the feature information of the two groups of image blocks are consistent, that is, values included in the feature information of the two groups of image blocks may be in a one-to-one correspondence. In this case, the LIF module may multiply feature information of an image block in a previous round by the leakage parameter, and then add the product to feature information of the image block in a current round to obtain a plurality of target values included in the current round.

$$u_{t+1}^n$$

represents an $n^{th}$ value in the plurality of target values. When a value of $$u_{t+1}^{n}$$

is greater than a preset threshold, it is determined that $$u_{t+1}^{n}$$

satisfies the excitation condition of the LIF module, the LIF module generates a piece of target data by using the activation function.

Still further, because the feature information of the image block may include feature information of an image block corresponding to at least one channel, correspondingly, the excitation condition of the LIF module may include one or more thresholds. Further, threshold values corresponding to different channels may be the same or different.

Figure 9:
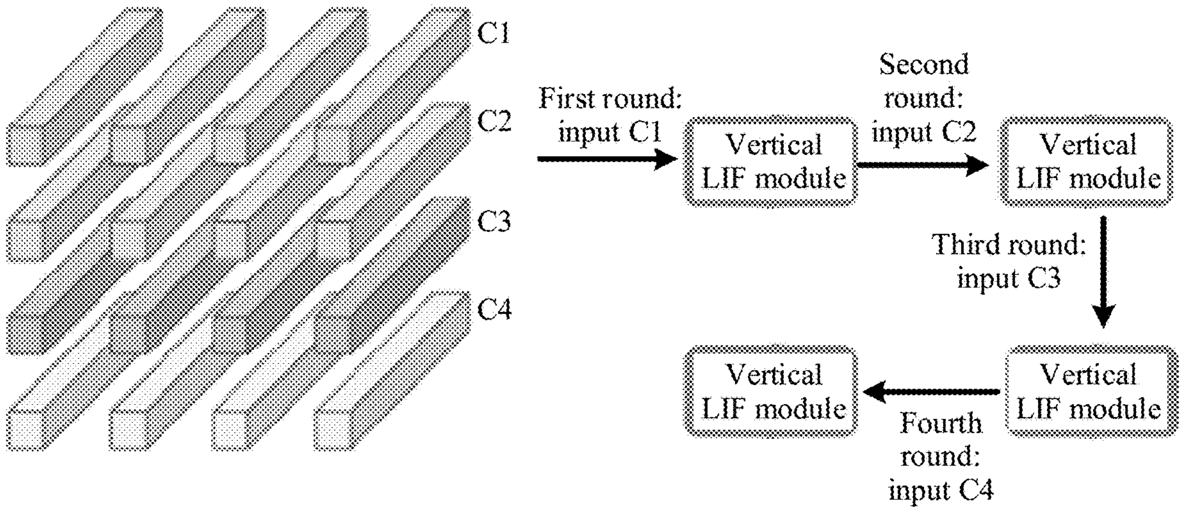
FIG. 9 is a schematic diagram of sequentially inputting feature information of at least two groups of image blocks into an LIF module in an image processing method according to an embodiment of this application.

For more intuitive understanding of this solution, FIG. 9 is a schematic diagram of sequentially inputting the feature information of the at least two groups of image blocks into the LIF module in the image processing method according to an embodiment of this application. In FIG. 9, an example in which feature information of a group of image blocks includes feature information of a row of image blocks is used. In a first round, the execution device may input feature information of a first row of images (that is, feature information of a group of image blocks represented by C1) into the vertical LIF module. In a second round, the execution device may input feature information of the first row of images (that is, feature information of a group of image blocks represented by C2) into the vertical LIF module. In a third round, the execution device may input feature information of the first row of images (that is, feature information of a group of image blocks represented by C3) into the vertical LIF module. In a fourth round, the execution device may input feature information of the first row of images (that is, feature information of a group of image blocks represented by C4) into the vertical LIF module. In this way, feature information of the four groups of image blocks is sequentially input into the LIF module. It should be understood that the example in FIG. 9 is merely intended to facilitate understanding of this solution rather than limiting this solution.

In an embodiment, one LIF unit of the first neural network may include M parallel vertical LIF modules. In each round, the execution device may simultaneously input feature information of M groups of image blocks into the M parallel vertical LIF modules, and process input data by using the M parallel vertical LIF modules.

In an embodiment, if the first neural network includes the horizontal LIF module, the execution device may group the feature information of the plurality of image blocks in the horizontal direction, and sequentially input obtained feature information of at least two groups of image blocks into the horizontal LIF module, that is, input feature information of a group of image blocks into the horizontal LIF module each time.

Each time after inputting feature information of at least one column of image blocks (that is, feature information of a group of image blocks) into the horizontal LIF module, the execution device determines whether an excitation condition of the horizontal LIF module is satisfied. If a determining result is that the excitation condition of the horizontal LIF module is not satisfied, the horizontal LIF module may not generate any value. If a determining result is that the excitation condition of the horizontal LIF module is satisfied, the horizontal LIF module may generate the target data by using the activation function, and reset a film potential of the horizontal LIF module to 0. The execution device continues to input feature information of a next group of image blocks into the horizontal LIF module, to leak and integrate the feature information of the two groups of image blocks. The execution device repeatedly performs the foregoing operations, to complete processing feature information of all the image blocks by using the horizontal LIF module.

It should be noted that manners of processing the input data by the "vertical LIF module" and the "horizontal LIF module" are similar. For an implementation of the horizontal LIF module, refer to the foregoing descriptions. Details are not described herein again.

In an embodiment, one LIF unit of the first neural network may include M parallel horizontal LIF modules. In each round, the execution device may simultaneously input feature information of M groups of image blocks into the M parallel horizontal LIF modules, and process input data by using the M parallel horizontal LIF modules.

Figure 10:
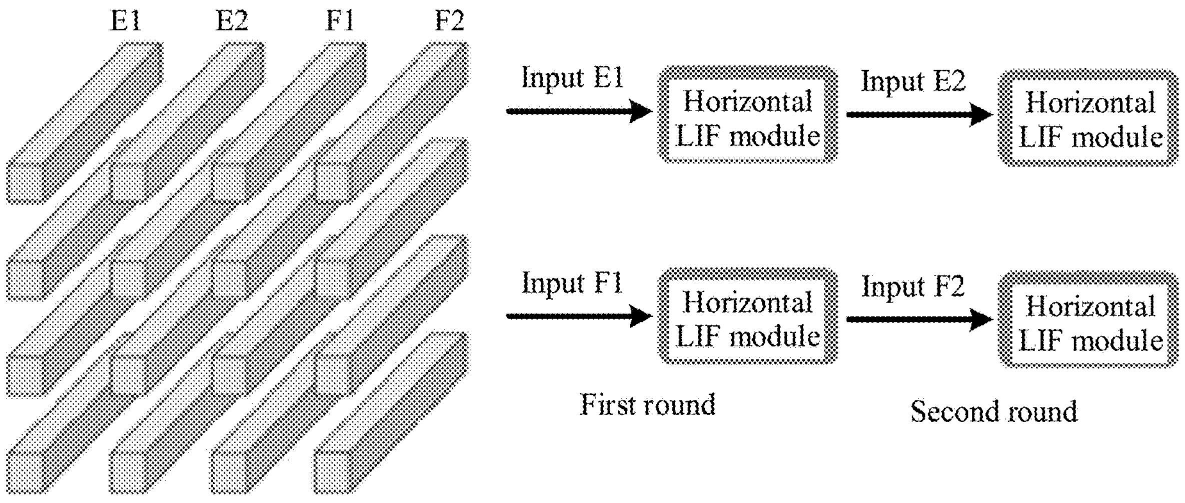
FIG. 10 is a schematic diagram of sequentially inputting feature information of at least two groups of image blocks into an LIF module in an image processing method according to an embodiment of this application.

For more intuitive understanding of this solution, FIG. 10 is a schematic diagram of sequentially inputting the feature information of the at least two groups of image blocks into the LIF module in the image processing method according to an embodiment of this application. In FIG. 10, an example in which feature information of a group of image blocks includes feature information of a row of image blocks and one LIF unit has two parallel horizontal LIF modules is used. As shown in the figure, in a first round, the execution device inputs feature information of a first column of image blocks (that is, feature information of a group of image blocks represented by E1) into the horizontal LIF module, and inputs feature information of a third column of image blocks (that is, feature information of a group of image blocks represented by F1) into the horizontal LIF module, that is, separately inputs feature information of two groups of image blocks into two parallel horizontal LIF modules in one round.

In a second round, the execution device inputs feature information of a second column of image blocks (that is, feature information of a group of image blocks represented by E2) into the horizontal LIF module, and inputs feature information of a fourth column of image blocks (that is, feature information of a group of image blocks represented by F2) into the horizontal LIF module. In this way, feature information of the four groups of image blocks is input into two parallel horizontal LIF modules. It should be understood that the example in FIG. 10 is merely intended to facilitate understanding of this solution rather than limiting this solution.

If the first neural network includes both the vertical LIF module and the horizontal LIF module, the execution device may separately process, by using the vertical LIF module and the horizontal LIF module, feature information of all image blocks included in the to-be-processed image. Implementation details of the vertical LIF module and the horizontal LIF module are not described herein again.

304: The execution device obtains second feature information corresponding to the to-be-processed image based on the target data, where the second feature information includes updated feature information of the image block.

In an embodiment of the application, after obtaining a plurality of pieces of target data generated by the LIF module, the execution device may obtain the second feature information corresponding to the to-be-processed image based on the plurality of pieces of target data, where the second feature information includes the updated feature information of the image block, and both the first feature information and the second feature information are the feature information of the to-be-processed image.

In an embodiment, if the first neural network includes only the vertical LIF module or the horizontal LIF module, the execution device may determine the plurality of pieces of target data output by the vertical LIF module or the horizontal LIF module as the second feature information corresponding to the to-be-processed image; or may process the plurality of pieces of output target data again by using another neural network layer, and determine processed data as the second feature information corresponding to the to-be-processed image.

If the first neural network includes both the vertical LIF module and the horizontal LIF module, the execution device may fuse the target data output by the vertical LIF module and the target data output by the horizontal LIF module, and directly determine fused data as the second feature information corresponding to the to-be-processed image. Alternatively, the execution device may perform an update operation by using another neural network layer before or after performing a fusion operation.

Further, if the first neural network is represented as the MLP, the another neural network layer may be the MLP layer. If the first neural network is represented as the convolutional neural network, the another neural network layer may be the convolutional neural network layer. If the first neural network is represented as the transformer neural network, the another neural network layer may be the transformer neural network layer or the like. If the first neural network uses another type of neural network, the another neural network layer may be further replaced with another type of neural network layer or the like. Details are not described herein.

In an embodiment of the application, regardless of whether the first neural network is the MLP, the convolutional neural network, or the transformer neural network, the first neural network can be compatible with the LIF module by using the image processing method provided in an embodiment of the application. Because the MLP, the convolutional neural network, and the transformer neural network may be applied to different application scenarios, application scenarios of this solution are greatly extended and implementation flexibility is greatly improved.

It should be noted that the operations described in operations 302 to 304 are operations performed by one LIF unit in the first neural network. After obtaining the second feature information corresponding to the to-be-processed image, the execution device may update the second feature information by using another neural network layer, that is, update the feature information of the to-be-processed image again.

Further, it is understood with reference to FIG. 4 that, in a process in which the execution device obtains the feature information of the to-be-processed image by using the first neural network, operation 302 to operation 304 may be performed for a plurality of times. Quantities of times for performing operation 302 to operation 304 and operation 301 are not limited in embodiments of this application. Operation 305 may be performed after operation 301 is performed once and after operation 302 to operation 304 are performed for one or more times.

305: The execution device performs feature processing on the feature information of the to-be-processed image by using a second neural network, to obtain a prediction result corresponding to the to-be-processed image.

In an embodiment of the application, after generating the feature information of the to-be-processed image by using the first neural network, the execution device may perform feature processing on the feature information of the to-be-processed image by using the second neural network, to obtain the prediction result corresponding to the to-be-processed image. The first neural network and the second neural network are included in a same target neural network, and a task executed by the target neural network is any one of the following: image classification, image segmentation, performing target detection on an image, performing super-resolution processing on an image, another type of task, or the like. Implementation tasks of the target neural network are not exhaustively listed herein.

A meaning of the prediction result corresponding to the to-be-processed image depends on a type of the task executed by the target neural network. For example, if the task executed by the target neural network is image classification, the prediction result corresponding to the to-be-processed image may be used to indicate a prediction category corresponding to the to-be-processed image. For another example, if the task executed by the target neural network is performing target detection on an image, the prediction result corresponding to the to-be-processed image may be used to indicate a prediction category and a prediction location of each object in the to-be-processed image. For another example, if the task executed by the target neural network is image segmentation, the prediction result corresponding to the to-be-processed image may be used to indicate a prediction category of each pixel in the to-be-processed image. For another example, if the task executed by the target neural network is image segmentation, the prediction result corresponding to the to-be-processed image may include a processed image and the like. This is not exhaustively listed herein.

In embodiments of this application, a plurality of application scenarios of this solution are provided. This greatly improves implementation flexibility of this solution.

In an embodiment of the application, the feature information of the entire to-be-processed image is divided into feature information of a plurality of image blocks in the to-be-processed image, and the feature information of the plurality of image blocks may be divided into feature information of at least two groups of image blocks. The feature information of the at least two groups of image blocks is sequentially input into the LIF module, to obtain the target data generated by the LIF module, and then the updated feature information of the to-be-processed image is obtained based on the target data. In the foregoing manner, feature extraction is performed on a single image by using the LIF module, so that the LIF module can be used to execute mainstream general visual tasks.

2. Training Phase

Figure 11:
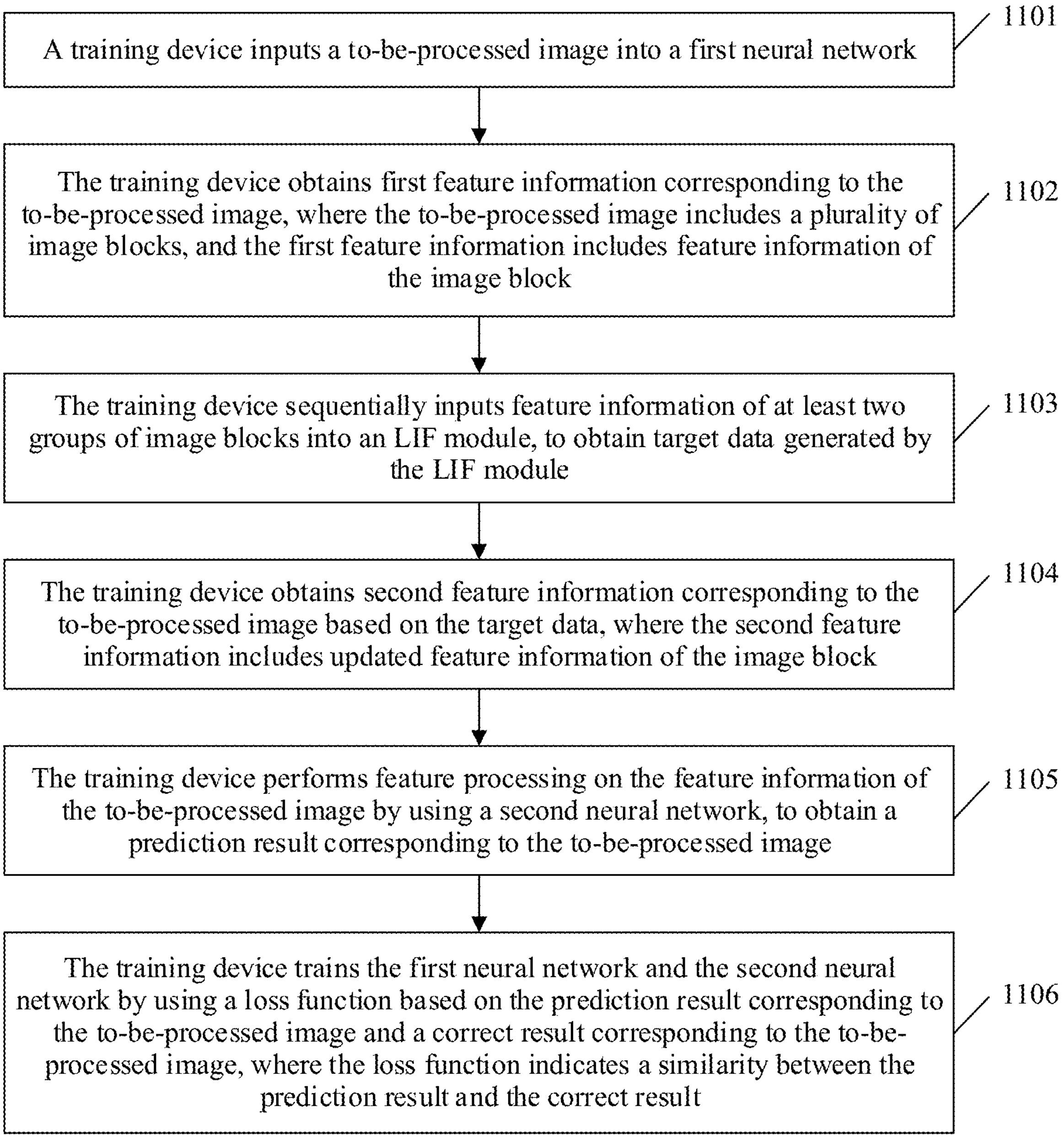
FIG. 11 is a schematic flowchart of a neural network training method according to an embodiment of this application.

In an embodiment of the application, FIG. 11 is a schematic flowchart of a neural network training method according to an embodiment of this application. The neural network training method provided in an embodiment of the application may include the following operations.

1101: A training device inputs a to-be-processed image into a first neural network.

1102: The training device obtains first feature information corresponding to the to-be-processed image, where the to-be-processed image includes a plurality of image blocks, and the first feature information includes feature information of the image block.

1103: The training device sequentially inputs feature information of at least two groups of image blocks into an LIF module, to implement leakage and integration processes of the LIF module, and obtain target data generated by the LIF module.

1104: The training device obtains second feature information corresponding to the to-be-processed image based on the target data, where the second feature information includes updated feature information of the image block.

1105: The training device performs feature processing on the feature information of the to-be-processed image by using the second neural network, to obtain the prediction result corresponding to the to-be-processed image.

In an embodiment of the application, a training data set may be configured on the training device. The training data set is used to train a target neural network. The target neural network includes a first neural network and a second neural network. A task executed by the target neural network is any one of the following: image classification, performing target detection on an image, image segmentation, performing super-resolution processing on an image, or another type of task. This is not exhaustively listed herein.

The training data set includes a plurality of pieces of training data, each piece of training data includes one to-be-processed image and a correct result corresponding to the to-be-processed image, and a meaning of the correct result corresponding to the to-be-processed image depends on a type of the task executed by the target neural network. Two concepts "the correct result corresponding to the to-be-processed image" and "the prediction result corresponding to the to-be-processed image" are similar. A difference lies in that the "the correct result corresponding to the to-be-processed image" includes correct information, and the "the prediction result corresponding to the to-be-processed image" includes information generated by the target neural network.

For an embodiment of operations 1101 to 1105, refer to the descriptions of operations 301 to 305 in the embodiment corresponding to FIG. 3. Details are not described herein again.

1106: The training device trains the first neural network and the second neural network by using a loss function based on the prediction result corresponding to the to-be-processed image and a correct result corresponding to the to-be-processed image, where the loss function indicates a similarity between the prediction result and the correct result.

In an embodiment of the application, the training device may generate a function value of the loss function based on the prediction result corresponding to the to-be-processed image and the correct result corresponding to the to-be-processed image, perform gradient derivation on the function value of the loss function, and back-broadcast a gradient value, to update weight parameters of the first neural network and the second neural network (that is, the target neural network), and complete training on the first neural network and the second neural network. The training device repeatedly performs operations 1101 to 1106 until a convergence condition is satisfied.

The loss function indicates the similarity between the prediction result corresponding to the to-be-processed image and the correct result corresponding to the to-be-processed image. A type of the loss function may be flexibly selected with reference to an actual application scenario. For example, if the task executed by the target neural network is image classification, a cross entropy loss function, a 0-1 loss function, another type of loss function, or the like may be selected as the loss function. The example herein is merely intended to facilitate understanding of this solution rather than limiting this solution.

The convergence condition may be that a convergence condition of the loss function is satisfied, or a quantity of iterations reaches a preset quantity of times, or the like. This is not limited herein.

In an embodiment of the application, implementation operations of the first neural network in an execution phase are provided, and implementation operations of the first neural network in the training phase are further provided. This extends application scenarios of this solution, and improves comprehensiveness of this solution.

For more intuitive understanding of beneficial effects brought by this solution, the following describes the beneficial effects brought by this solution with reference to experimental data. First, an example in which the target neural network executes an image classification task is used. An experiment is conducted on an ImageNet dataset, and obtained experiment results are shown in Table 1 below.

TABLE 1

| Neural network used | Top-1 accuracy |
|---|---|
| ResMLP-B24 | 81.0 |
| DeiT-B | 81.8 |
| AS-MLP-B | 83.3 |
| Embodiments of this application | 83.5 |

ResMLP-B24, DeiT-B, and AS-MLP-B are three existing neural networks. The three neural networks may be used to classify an image. It can be learned from the foregoing data that a classification result obtained by using a model provided in embodiments of this application has highest accuracy.

The following uses an example in which the target neural network performs target detection on an image, and obtained experiment results are shown in Table 2.

TABLE 2

| Neural network used | mIoU |
|---|---|
| DNL (a backbone network is ResNet-101) | 46.0 |
| Swin-S | 47.6 |
| OCRNet (a backbone network is HRNet-w48) | 45.7 |
| Embodiments of this application | 49.0 |

DNL, Swin-S, and OCRNet are all existing neural networks, and mIoU is an indicator for evaluating precision of a detection result of target detection performed on an image. It can be learned from the foregoing data that a target detection result obtained by using a model provided in embodiments of this application has highest precision.

Figure 12:
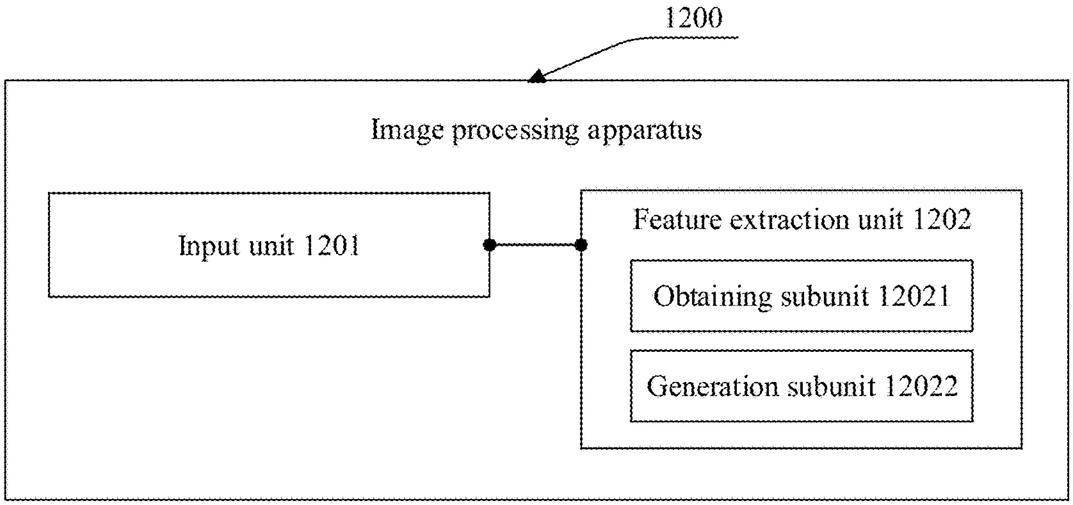
FIG. 12 is a schematic diagram of a structure of an image processing apparatus according to an embodiment of this application.

Based on the embodiments corresponding to FIG. 1 to FIG. 11, to better implement the foregoing solutions in embodiments of this application, the following further provides a related device configured to implement the foregoing solutions. In an embodiment, FIG. 12 is a schematic diagram of a structure of an image processing apparatus according to an embodiment of this application. An image processing apparatus 1200 includes: an input unit 1201, configured to input a to-be-processed image into a first neural network; and a feature extraction unit 1202, configured to perform feature extraction on the to-be-processed image by using the first neural network, to obtain feature information of the to-be-processed image.

The feature extraction unit 1202 includes: an obtaining subunit 12021, configured to obtain first feature information corresponding to the to-be-processed image, where the to-be-processed image includes a plurality of image blocks, and the first feature information includes feature information of the image block; and a generation subunit 12022, configured to sequentially input feature information of at least two groups of image blocks into a leaky integrate and fire LIF module, to obtain target data generated by the LIF module, where feature information of a group of image blocks includes feature information of at least one image block. The obtaining subunit 12021 is configured to obtain second feature information corresponding to the to-be-processed image based on the target data, where the second feature information includes updated feature information of the image block, and both the first feature information and the second feature information are the feature information of the to-be-processed image.

In an embodiment, the generation subunit 12022 is configured to: sequentially input the feature information of the at least two groups of image blocks into the LIF module, and when an excitation condition of the LIF module is satisfied, generate the target data by using an activation function, where the target data is not binarized data.

In an embodiment, the first neural network is a multilayer perceptron MLP, a convolutional neural network, or a neural network using a self-attention mechanism.

In an embodiment, the image processing apparatus 1200 further includes a feature processing unit, configured to perform feature processing on the feature information of the to-be-processed image by using a second neural network, to obtain a prediction result corresponding to the to-be-processed image, where the first neural network and the second neural network are included in a same target neural network, and a task executed by the target neural network is any one of the following: classification, segmentation, target detection, or super-resolution.

It should be noted that content such as information exchange and an execution process between the modules/units in the image processing apparatus 1200 is based on a same concept as the method embodiment corresponding to FIG. 3 to FIG. 10 in this application. For content, refer to the descriptions in the foregoing method embodiments in this application. Details are not described herein again.

Figure 13:
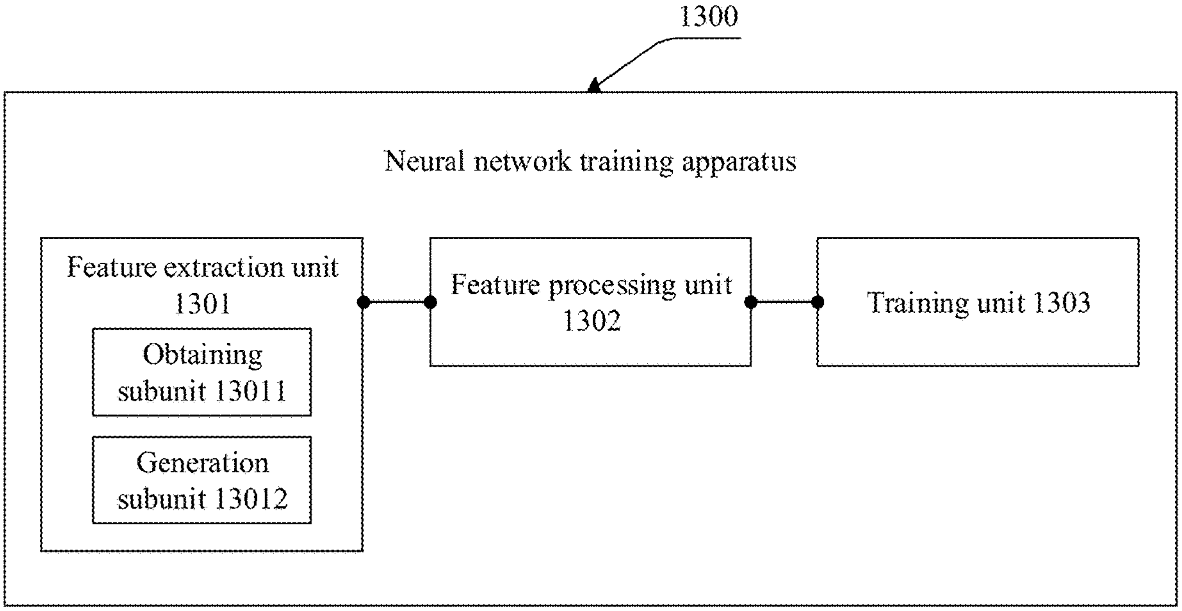
FIG. 13 is a schematic diagram of a structure of a neural network training apparatus according to an embodiment of this application.

FIG. 13 is a schematic diagram of a structure of a neural network training apparatus according to an embodiment of this application. A neural network training apparatus 1300 includes: a feature extraction unit 1301, configured to: input a to-be-processed image into a first neural network, and perform feature extraction on the to-be-processed image by using the first neural network, to obtain feature information of the to-be-processed image; a feature processing unit 1302, configured to perform feature processing on the feature information of the to-be-processed image by using a second neural network, to obtain a prediction result corresponding to the to-be-processed image; and a training unit 1303, configured to train the first neural network and the second neural network by using a loss function based on the prediction result and a correct result that correspond to the to-be-processed image, where the loss function indicates a similarity between the prediction result and the correct result.

The feature extraction unit 1301 includes: an obtaining subunit 13011, configured to obtain first feature information corresponding to the to-be-processed image, where the to-be-processed image includes a plurality of image blocks, and the first feature information includes feature information of the image block; and a generation subunit 13012, configured to sequentially input feature information of at least two groups of image blocks into a leaky integrate and fire LIF module, to obtain target data generated by the LIF module, where feature information of a group of image blocks includes feature information of at least one image block. The obtaining subunit 13011 is further configured to obtain second feature information corresponding to the to-be-processed image based on the target data, where the second feature information includes updated feature information of the image block, and both the first feature information and the second feature information are the feature information of the to-be-processed image.

In an embodiment, the generation subunit 13012 is configured to: sequentially input the feature information of the at least two groups of image blocks into the LIF module, and when an excitation condition of the LIF module is satisfied, generate the target data by using an activation function, where the target data is not binarized data.

It should be noted that content such as information exchange and an execution process between the modules/units in the neural network training apparatus 1300 is based on a same concept as the method embodiment corresponding to FIG. 11 in this application. For content, refer to the descriptions in the foregoing method embodiment in this application. Details are not described herein again.

Figure 14:
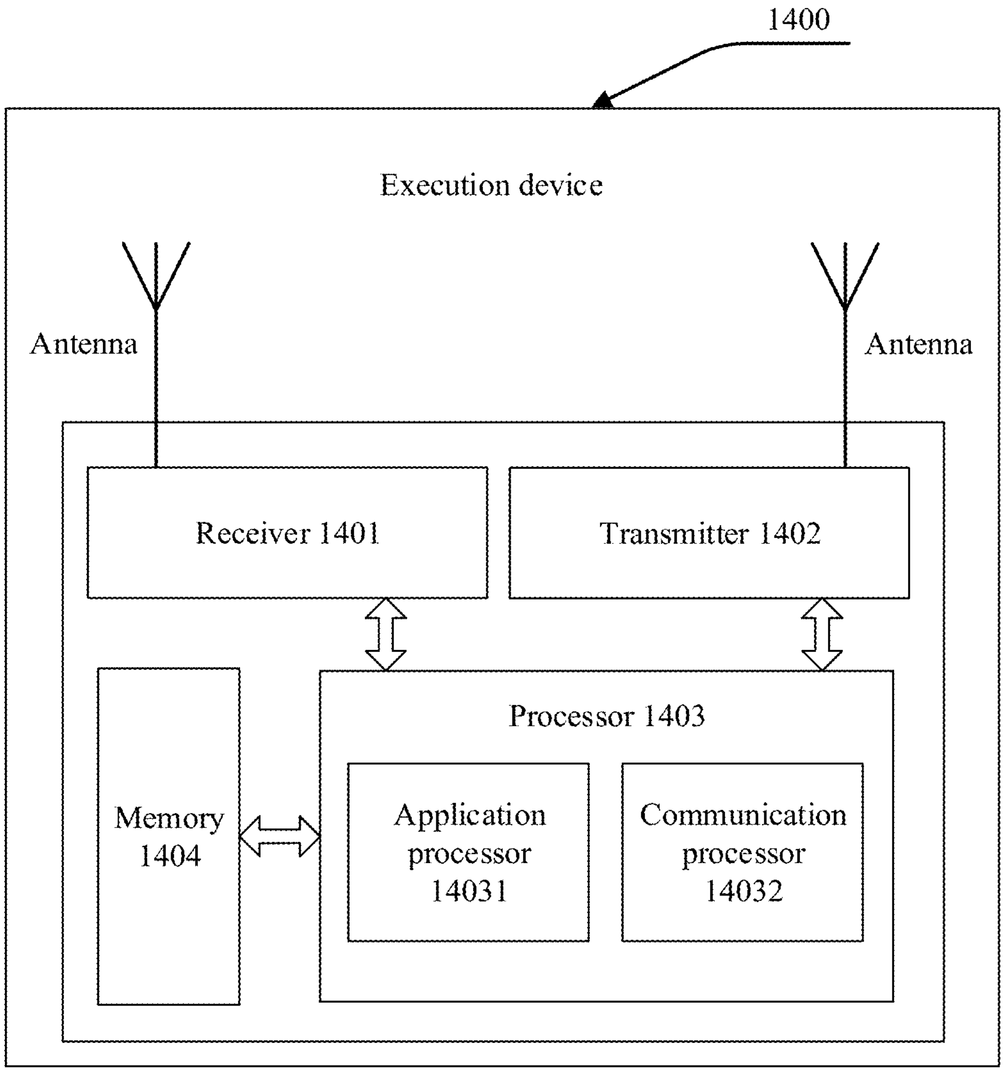
FIG. 14 is a schematic diagram of a structure of an execution device according to an embodiment of this application.

The following describes an execution device provided in an embodiment of this application. FIG. 14 is a schematic diagram of a structure of an execution device according to an embodiment of this application. An execution device 1400 may be represented as a virtual reality VR device, a mobile phone, a tablet computer, a notebook computer, an intelligent wearable device, a monitoring data processing device, or the like. This is not limited herein. In an embodiment, the execution device 1400 includes a receiver 1401, a transmitter 1402, a processor 1403, and a memory 1404 (there may be one or more processors 1403 in the execution device 1400, and one processor is used as an example in FIG. 14). The processor 1403 may include an application processor 14031 and a communication processor 14032. In some embodiments of this application, the receiver 1401, the transmitter 1402, the processor 1403, and the memory 1404 may be connected through a bus or in another manner.

The memory 1404 may include a read-only memory and a random access memory, and provide instructions and data to the processor 1403. A part of the memory 1404 may further include a non-volatile random access memory (NVRAM). The memory 1404 stores a processor and operation instructions, an executable module or a data structure, a subset thereof, or an expanded set thereof. The operation instructions may include various operation instructions for implementing various operations.

The processor 1403 controls an operation of the execution device. In an application, the components of the execution device are coupled together through a bus system. In addition to a data bus, the bus system may further include a power bus, a control bus, a status signal bus, and the like. However, for clear description, various types of buses in the figure are marked as the bus system.

The methods disclosed in embodiments of this application may be applied to the processor 1403 or may be implemented by the processor 1403. The processor 1403 may be an integrated circuit chip and has a signal processing capability. In an implementation process, the operations in the foregoing methods can be implemented by using a hardware integrated logic circuit in the processor 1403, or by using instructions in a form of software. The processor 1403 may be a general-purpose processor, a digital signal processor (DSP), a microprocessor, or a microcontroller. The processor 1403 may further include an application-specific integrated circuit (ASIC), a field-programmable gate array (FPGA) or another programmable logic device, a discrete gate or transistor logic device, or a discrete hardware component. The processor 1403 may implement or perform the methods, the operations, and logical block diagrams that are disclosed in embodiments of this application. The general-purpose processor may be a microprocessor, or the processor may be any conventional processor or the like. The operations in the methods disclosed with reference to embodiments of this application may be directly performed and completed by a hardware decoding processor, or may be performed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1404, and the processor 1403 reads information in the memory 1404 and completes the operations in the foregoing methods in combination with hardware of the processor 1403.

The receiver 1401 may be configured to receive input digit or character information, and generate a signal input related to a related setting and function control of the execution device. The transmitter 1402 may be configured to output digital or character information through a first interface. The transmitter 1402 may be further configured to send instructions to a disk group through the first interface, to modify data in the disk group. The transmitter 1402 may further include a display device, for example, a display.

In an embodiment of the application, the processor 1403 is configured to perform the image processing method performed by the execution device in the embodiment corresponding to FIG. 3 to FIG. 10. In an embodiment, the application processor 14031 is configured to perform the following operations:

inputting a to-be-processed image into a first neural network, and performing feature extraction on the to-be-processed image by using the first neural network, to obtain feature information of the to-be-processed image.

The performing feature extraction on the to-be-processed image by using the first neural network includes: obtaining first feature information corresponding to the to-be-processed image, where the to-be-processed image includes a plurality of image blocks, and the first feature information includes feature information of the image block; sequentially inputting feature information of at least two groups of image blocks into a leaky integrate and fire LIF module, to obtain target data generated by the LIF module, where feature information of a group of image blocks includes feature information of at least one image block; and obtaining second feature information corresponding to the to-be-processed image based on the target data, where the second feature information includes updated feature information of the image block, and both the first feature information and the second feature information are the feature information of the to-be-processed image.

It should be noted that a manner in which the application processor 14031 performs the foregoing operations is based on a same concept as the method embodiments corresponding to FIG. 3 and FIG. 10 in this application. Technical effects brought by the manner are the same as those in the method embodiments corresponding to FIG. 3 and FIG. 10 in this application. For content, refer to the descriptions in the foregoing method embodiments in this application. Details are not described herein again.

Figure 15:
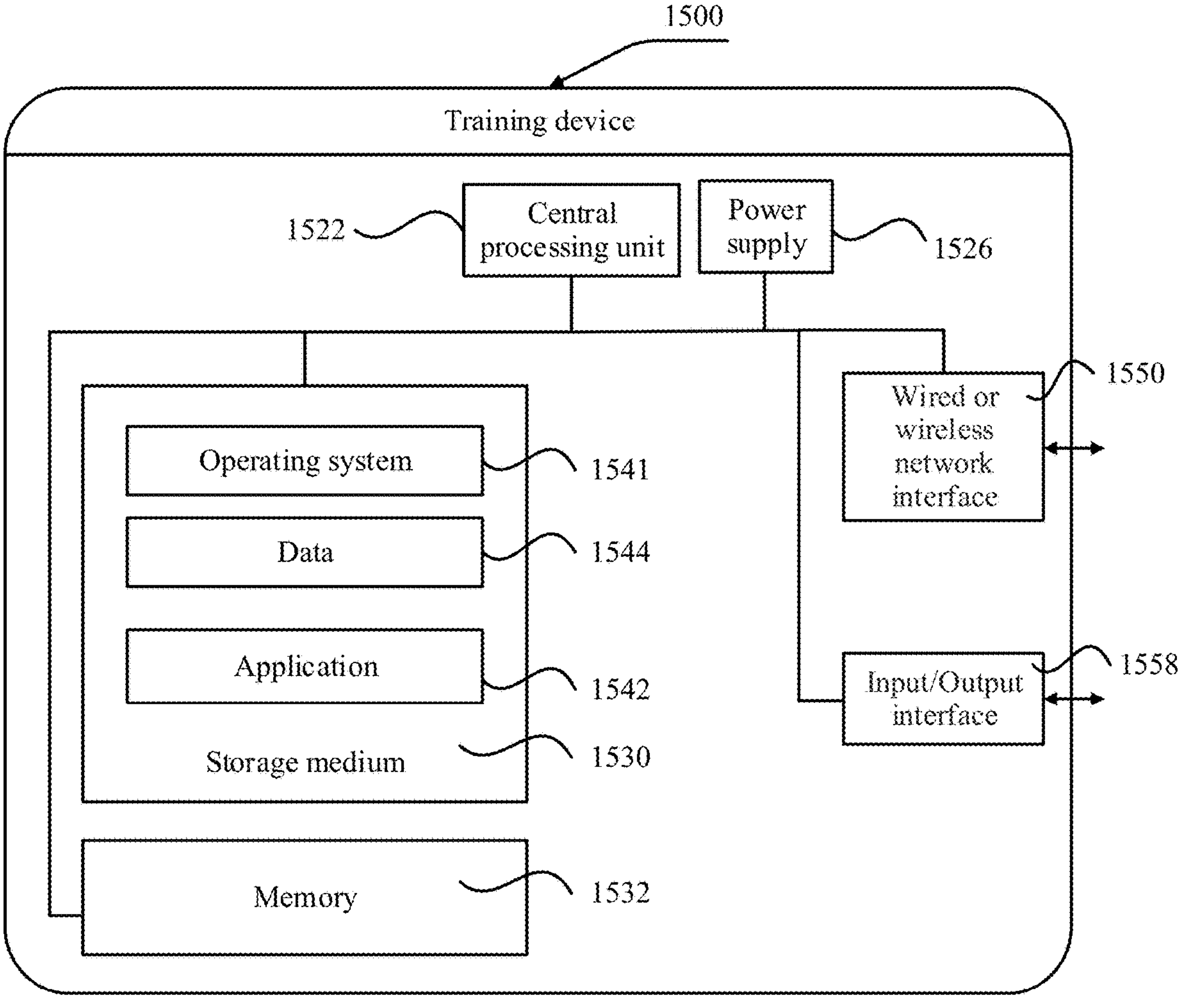
FIG. 15 is a schematic diagram of a structure of a training device according to an embodiment of this application.

An embodiment of this application further provides a training device. FIG. 15 is a schematic diagram of a structure of a training device according to an embodiment of this application. In an embodiment, the training device 1500 is implemented by one or more servers. The training device 1500 may differ greatly based on different configurations or performance, and may include one or more central processing units (CPUs) 1522 (for example, one or more processors), a memory 1532, and one or more storage media 1530 (for example, one or more mass storage devices) for storing an application 1542 or data 1544. The memory 1532 and the storage medium 1530 may be transient storage or persistent storage. A program stored in the storage medium 1530 may include one or more modules (not shown in the figure), and each module may include a series of instruction operations performed on the training device. Further, the central processing unit 1522 may be configured to communicate with the storage medium 1530, and perform, on the training device 1500, a series of instruction operations in the storage medium 1530.

The training device 1500 may further include one or more power supplies 1526, one or more wired or wireless network interfaces 1550, one or more input/output interfaces 1558, and/or one or more operating systems 1541, for example, Windows Server™, Mac OS X™, Unix™, Linux™, and FreeBSD™.

In an embodiment of the application, the central processing unit 1522 is configured to perform the image processing method performed by the training device in the embodiment corresponding to FIG. 12. In an embodiment, the central processing unit 1522 is configured to perform the following operations:

inputting a to-be-processed image into a first neural network, performing feature extraction on the to-be-processed image by using the first neural network, to obtain feature information of the to-be-processed image, and performing feature processing on the feature information of the to-be-processed image by using a second neural network, to obtain a prediction result corresponding to the to-be-processed image; and training the first neural network and the second neural network by using a loss function based on the prediction result and a correct result that correspond to the to-be-processed image, where the loss function indicates a similarity between the prediction result and the correct result.

The performing feature extraction on the to-be-processed image by using the first neural network includes: obtaining first feature information corresponding to the to-be-processed image, where the to-be-processed image includes a plurality of image blocks, and the first feature information includes feature information of the image block; sequentially inputting feature information of at least two groups of image blocks into a leaky integrate and fire LIF module, to obtain target data generated by the LIF module, where feature information of a group of image blocks includes feature information of at least one image block; and obtaining second feature information corresponding to the to-be-processed image based on the target data, where the second feature information includes updated feature information of the image block, and both the first feature information and the second feature information are the feature information of the to-be-processed image.

It should be noted that a manner in which the central processing unit 1522 performs the foregoing operations is based on a same concept as the method embodiment corresponding to FIG. 11 in this application. Technical effects brought by the manner are the same as those in the method embodiment corresponding to FIG. 11 in this application. For content, refer to the descriptions in the foregoing method embodiment in this application. Details are not described herein again.

An embodiment of this application further provides a computer program product. When the computer program product runs on a computer, the computer is enabled to perform operations performed by the execution device in the method described in embodiments shown in FIG. 3 to FIG. 10; or the computer is enabled to perform operations performed by the training device in the method described in the embodiment shown in FIG. 11.

An embodiment of this application further provides a computer-readable storage medium. The computer-readable storage medium stores a program used to perform signal processing. When the program is run on a computer, the computer is enabled to perform operations performed by the execution device in the method described in embodiments shown in FIG. 3 to FIG. 10, or the computer is enabled to perform operations performed by the training device in the method described in the embodiment shown in FIG. 11.

The image processing apparatus, the neural network training apparatus, the execution device, or the training device provided in embodiments of this application may be a chip. The chip includes a processing unit and a communication unit. The processing unit may be, for example, a processor. The communication unit may be, for example, an input/output interface, a pin, or a circuit. The processing unit may execute computer-executable instructions stored in a storage unit, to enable a chip to perform the image processing method described in the embodiments shown in FIG. 3 to FIG. 10, or enable a chip in the training device to perform the neural network training method described in the embodiment shown in FIG. 11. In an embodiment, the storage unit is a storage unit in the chip, for example, a register or a cache; or the storage unit may be a storage unit that is in the radio access device end and that is located outside the chip, for example, a read-only memory (ROM), another type of static storage device that can store static information and instructions, or a random access memory (RAM).

Figure 16:
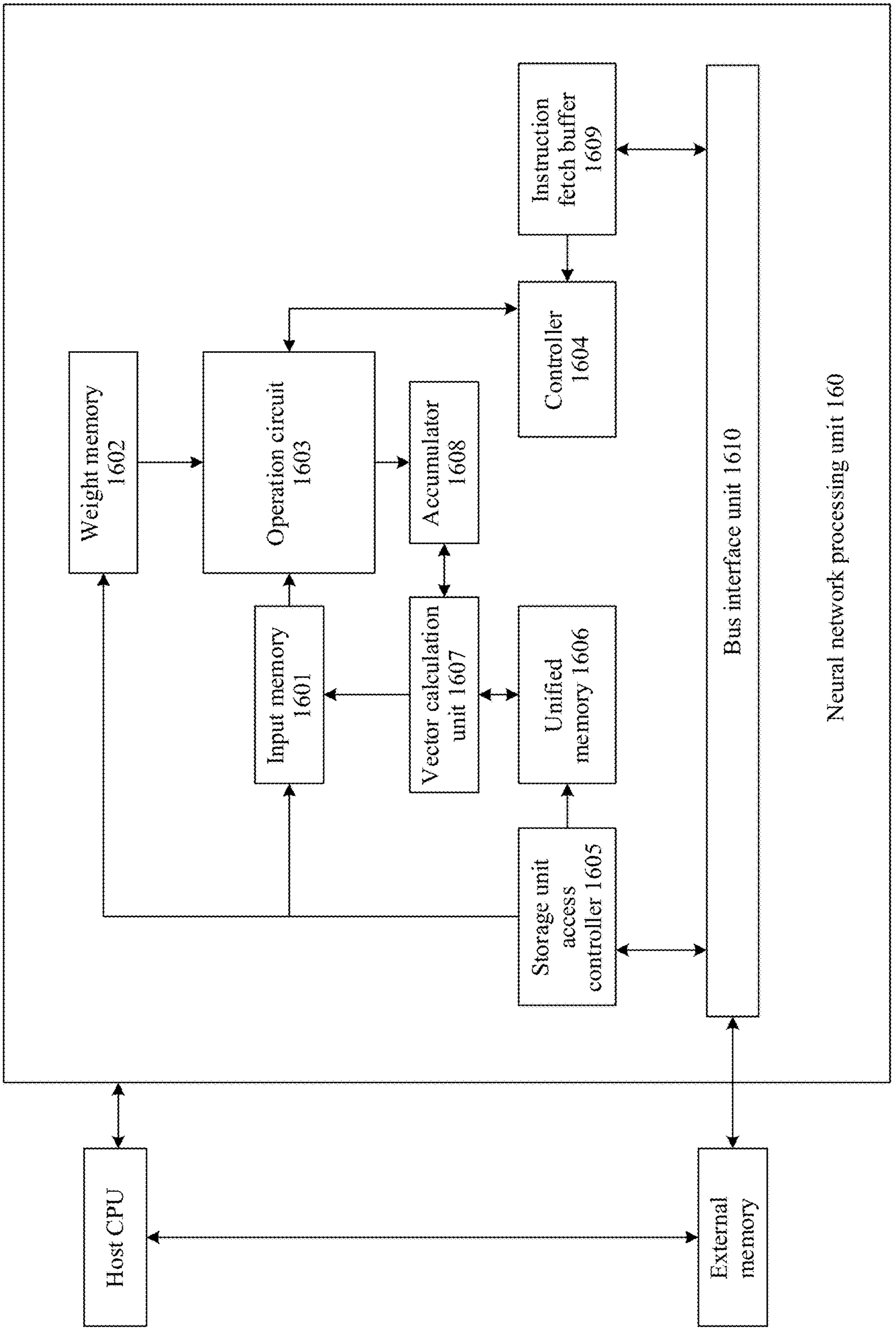
FIG. 16 is a schematic diagram of a structure of a chip according to an embodiment of this application.

In an embodiment, FIG. 16 is a schematic diagram of a structure of a chip according to an embodiment of this application. The chip may be represented as a neural network processing unit NPU 160. The NPU 160 is mounted to a host CPU as a coprocessor, and the host CPU allocates a task. A core part of the NPU is an operation circuit 1603. The operation circuit 1603 is controlled by a controller 1604 to extract matrix data in a memory and perform a multiplication operation.

In an embodiment, the operation circuit 1603 includes a plurality of processing units (Process Engine, PE). In an embodiment, the operation circuit 1603 is a two-dimensional systolic array. The operation circuit 1603 may alternatively be a one-dimensional systolic array or another electronic circuit capable of performing mathematical operations such as multiplication and addition. In an embodiment, the operation circuit 1603 is a general-purpose matrix processor.

For example, it is assumed that there is an input matrix A, a weight matrix B, and an output matrix C. The operation circuit fetches data corresponding to the matrix B from a weight memory 1602 and buffers the data on each PE in the operation circuit. The operation circuit fetches data of the matrix A from an input memory 1601, to perform a matrix operation with the matrix B to obtain a partial result or a final result of a matrix, and stores the result into an accumulator 1608.

A unified memory 1606 is configured to store input data and output data. Weight data is directly transferred to the weight memory 1602 by using a direct memory access controller (DMAC) DMAC 1605. The input data is also transferred to the unified memory 1606 by using the DMAC.

A BIU is a bus interface unit, namely, a bus interface unit 1610, and is configured to perform interaction between an AXI bus, and the DMAC and an instruction fetch buffer (IFB) 1609.

The bus interface unit 1610 (Bus Interface Unit, BIU for short) is used by the instruction fetch buffer 1609 to obtain an instruction from an external memory, and further used by the memory access controller 1605 to obtain original data of the input matrix A or the weight matrix B from the external memory.

The DMAC is mainly configured to: transfer input data in an external memory DDR to the unified memory 1606, transfer the weight data to the weight memory 1602, or transfer the input data to the input memory 1601.

A vector calculation unit 1607 includes a plurality of operation processing units. When necessary, further processing is performed on an output of the operation circuit, such as vector multiplication, vector addition, exponential operation, logarithmic operation, and value comparison. The vector calculation unit 1607 is mainly used for non-convolutional or fully connected layer network calculation in a neural network, for example, batch normalization, pixel-level summation, and up-sampling of a feature map.

In an embodiment, the vector calculation unit 1607 can store, into the unified memory 1606, a processed output vector. For example, the vector calculation unit 1607 may apply a linear function and/or a non-linear function to the output of the operation circuit 1603, for example, perform linear interpolation on a feature plane extracted at a convolutional layer. For another example, a linear function and/or a non-linear function is applied to a vector of an accumulated value to generate an activation value. In an embodiment, the vector calculation unit 1607 generates a normalized value, a pixel-level sum, or a normalized value and a pixel-level sum. In an embodiment, the processed output vector can be used as an activation input to the operation circuit 1603, for example, the processed output vector is used in a subsequent layer in the neural network.

The instruction fetch buffer 1609 connected to the controller 1604 is configured to store instructions used by the controller 1604.

The unified memory 1606, the input memory 1601, the weight memory 1602, and the instruction fetch buffer 1609 are all on-chip memories. The external memory is private for a hardware architecture of the NPU.

Operations at layers of the first neural network and the second neural network shown in FIG. 3 to FIG. 11 may be performed by the operation circuit 1603 or the vector calculation unit 1607.

Any one of the foregoing processors may be a general-purpose central processing unit, a microprocessor, an ASIC, or one or more integrated circuits configured to control execution of a program of the method in the first aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected depending on actual requirements to achieve the objectives of the solutions of embodiments. In addition, in the accompanying drawings of the apparatus embodiments provided by this application, connection relationships between modules indicate that the modules have communication connections with each other, which may be implemented as one or more communication buses or signal cables.

Based on the description of the foregoing implementations, one of ordinary skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, a network device, or the like) to perform the methods in embodiments of this application.

All or some of the foregoing embodiments may be implemented by using software, hardware, firmware, or any combination thereof. When software is used to implement embodiments, all or some of embodiments may be implemented in a form of a computer program product.

The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a training device, or a data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. An image processing method, comprising:

inputting an image into a first neural network; and performing feature extraction on the image by using the first neural network, to obtain feature information of the image, including:

obtaining first feature information corresponding to the image, wherein the image comprises a plurality of image blocks, and the first feature information comprises feature information of an image block of the plurality of image blocks, sequentially inputting feature information of at least two groups of image blocks of the plurality of image blocks into a leaky integrate and fire (LIF) module, to obtain target data generated by the LIF module, wherein feature information of a group of image blocks of the plurality of image blocks comprises feature information of at least one image block, and obtaining second feature information corresponding to the image based on the target data, wherein the second feature information comprises updated feature information of the image block, and both the first feature information and the second feature information are the feature information of the image.

2. The method according to claim 1, wherein the sequentially inputting feature information of the at least two groups of image blocks into the LIF module, to obtain the target data generated by the LIF module comprises:

sequentially inputting the feature information of the at least two groups of image blocks into the LIF module; and when an excitation condition of the LIF module is satisfied, generating the target data by using an activation function, wherein the target data is not binarized data.

3. The method according to claim 1, wherein the first neural network is a multilayer perceptron (MLP), a convolutional neural network, or a neural network using a self-attention mechanism.

4. The method according to claim 1, further comprising:

performing feature processing on the feature information of the image by using a second neural network, to obtain a prediction result corresponding to the image, wherein the first neural network and the second neural network are comprised in a same target neural network, and a task executed by the target neural network is one of: classification, segmentation, target detection, or super-resolution.

5. A neural network training method, comprising:

inputting a image into a first neural network:

performing feature extraction on the image by using the first neural network, to obtain feature information of the image, including:

obtaining first feature information corresponding to the image, wherein the image comprises a plurality of image blocks, and the first feature information comprises feature information of an image block of the plurality of image blocks, sequentially inputting feature information of at least two groups of image blocks of the plurality of image blocks into a leaky integrate and fire (LIF) module, to obtain target data generated by the LIF module, wherein feature information of a group of image blocks of the plurality of image blocks comprises feature information of at least one image block, and obtaining second feature information corresponding to the image based on the target data, wherein the second feature information comprises updated feature information of the image block, and both the first feature information and the second feature information are the feature information of the image;

performing feature processing on the feature information of the image by using a second neural network, to obtain a prediction result corresponding to the image; and training the first neural network and the second neural network by using a loss function based on the prediction result and a correct result that correspond to the image, wherein the loss function indicates a similarity between the prediction result and the correct result.

6. The method according to claim 5, wherein the sequentially inputting feature information of the at least two groups of image blocks into the LIF module, to obtain the target data generated by the LIF module comprises:

sequentially inputting the feature information of the at least two groups of image blocks into the LIF module; and when an excitation condition of the LIF module is satisfied, generating the target data by using an activation function, wherein the target data is not binarized data.

7. An image processing apparatus, comprising:

an input unit, configured to input an image into a first neural network; and a feature extraction unit, configured to perform feature extraction on the image by using the first neural network, to obtain feature information of the image, wherein the feature extraction unit comprises:

an obtaining subunit, configured to obtain first feature information corresponding to the image, wherein the image comprises a plurality of image blocks, and the first feature information comprises feature information of an image block of the plurality of image blocks; and a generation subunit, configured to sequentially input feature information of at least two groups of image blocks of the plurality of image blocks into a leaky integrate and fire (LIF) module, to obtain target data generated by the LIF module, wherein feature information of a group of image blocks of the plurality of image blocks comprises feature information of at least one image block, wherein the obtaining subunit is configured to obtain second feature information corresponding to the image based on the target data, wherein the second feature information comprises updated feature information of the image block, and both the first feature information and the second feature information are the feature information of the image.

8. The apparatus according to claim 7, wherein the generation subunit is configured to: sequentially input the feature information of the at least two groups of image blocks into the LIF module, and when an excitation condition of the LIF module is satisfied, generate the target data by using an activation function, wherein the target data is not binarized data.

9. The apparatus according to claim 7, wherein the first neural network is a multilayer perceptron (MLP), a convolutional neural network, or a neural network using a self-attention mechanism.

10. The apparatus according to claim 7, further comprising:

a feature processing unit, configured to perform feature processing on the feature information of the image by using a second neural network, to obtain a prediction result corresponding to the image, wherein the first neural network and the second neural network are comprised in a same target neural network, and a task executed by the target neural network is one of: classification, segmentation, target detection, or super-resolution.

* * * * *